(12) United States Patent
Hachiya et al.

(10) Patent No.: US 9,321,884 B2
(45) Date of Patent: Apr. 26, 2016

(54) PROCESS FOR PRODUCING POLYCONDENSATION POLYMER, AND POLYMERIZER

(75) Inventors: Hiroshi Hachiya, Tokyo (JP); Yoko Hachiya, legal representative, Kurashiki (JP); Muneaki Aminaka, Tokyo (JP); Kazuharu Yasuda, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 390 days.

(21) Appl. No.: 13/879,279

(22) PCT Filed: Oct. 14, 2011

(86) PCT No.: PCT/JP2011/073658
§ 371 (c)(1),
(2), (4) Date: Apr. 12, 2013

(87) PCT Pub. No.: WO2012/056903
PCT Pub. Date: May 3, 2012

(65) Prior Publication Data
US 2013/0211035 A1    Aug. 15, 2013

(30) Foreign Application Priority Data

Oct. 29, 2010  (JP) ............................... P2010-244745
Oct. 29, 2010  (JP) ............................... P2010-244746

(51) Int. Cl.
*C08G 64/20* (2006.01)
*B01J 19/24* (2006.01)
(Continued)

(52) U.S. Cl.
CPC ............. *C08G 64/205* (2013.01); *B01J 19/247* (2013.01); *C08G 63/785* (2013.01); *C08G 69/00* (2013.01); *B01J 2219/32286* (2013.01); *B01J 2219/32408* (2013.01)

(58) Field of Classification Search
CPC .................... B01J 19/247; B01J 2219/32286; C08G 63/785; C08G 64/205

USPC ........................................................ 528/204
See application file for complete search history.

(56) References Cited

U.S. PATENT DOCUMENTS 3,535,280 A    10/1970    Schnell et al.
3,888,826 A     6/1975    Yamana et al.
(Continued)

FOREIGN PATENT DOCUMENTS

CN           1946760 A     4/2007
CN         101080437 A    11/2007
(Continued)

OTHER PUBLICATIONS

International Search Report, mailed Nov. 8, 2011, issued in PCT/JP2011/073658.
(Continued)

*Primary Examiner* — Fred M Teskin
(74) *Attorney, Agent, or Firm* — Birch, Stewart, Kolasch & Birch, LLP

(57) ABSTRACT

A method for producing a condensation polymerization reaction polymer, comprising a guide polymerization step in which a molten prepolymer is supplied to the top edge of a wire guide to obtain the condensation polymerization reaction polymer, the wire guide comprising a vertical wire group consisting of a plurality of vertical wires extending in the vertical direction, which are mutually spaced in alignment at an arrangement pitch L1 (mm). In the guide polymerization step, the molten prepolymer aggregates so that a molten prepolymer mass is formed on the vertical wire, and a molten prepolymer mass is formed wherein, the width of the molten prepolymer mass measured in an alignment direction of the vertical wires at a position 200 mm below the top edge being represented as L2 (mm), the width L2 of at least a portion of the molten prepolymer mass satisfies the inequality (1).

$$L1 < L2 \qquad (1)$$

10 Claims, 11 Drawing Sheets

(51) Int. Cl.
*C08G 63/78* (2006.01)
*C08G 69/00* (2006.01)

(56) References Cited

U.S. PATENT DOCUMENTS

| | | |
|---|---|---|
| 5,840,826 A | 11/1998 | Komiya et al. |
| 6,265,526 B1 | 7/2001 | Komiya et al. |
| 6,429,276 B1 | 8/2002 | Komiya et al. |
| 2002/0092625 A1 | 7/2002 | Kohlgruber et al. |
| 2007/0148055 A1 | 6/2007 | Fukuoka et al. |
| 2007/0197763 A1 | 8/2007 | Fukuoka et al. |
| 2007/0283904 A1 | 12/2007 | Fukuoka et al. |
| 2008/0234444 A1 | 9/2008 | Fukuoka et al. |
| 2008/0274320 A1 | 11/2008 | Yokoyama et al. |
| 2009/0156759 A1 | 6/2009 | Fukuoka et al. |

FOREIGN PATENT DOCUMENTS

| | | |
|---|---|---|
| CN | 101321805 A | 12/2008 |
| EA | 200601808 A1 | 2/2007 |
| JP | 50-19600 B | 7/1975 |
| JP | 52-36159 B | 9/1977 |
| JP | 53-5718 B | 3/1978 |
| JP | 2-153923 A | 6/1990 |
| JP | 7-292097 A | 11/1995 |
| JP | 8-225641 A | 9/1996 |
| JP | 8-225643 A | 9/1996 |
| JP | 8-325373 A | 12/1996 |
| JP | 10-81741 A | 3/1998 |
| JP | 10-298279 A | 11/1998 |
| JP | 2004-516172 A | 6/2004 |
| TW | 459004 B | 10/2001 |
| WO | WO 97/22650 A1 | 6/1997 |
| WO | WO 99/24492 A1 | 5/1999 |
| WO | WO 99/36457 A1 | 7/1999 |
| WO | WO 99/64492 A1 | 12/1999 |
| WO | WO 99/65970 A1 | 12/1999 |
| WO | WO 2005/035620 A1 | 4/2005 |
| WO | WO 2005/121210 A1 | 12/2005 |
| WO | WO 2005/123805 A1 | 12/2005 |
| WO | WO 2007/063757 A1 | 6/2007 |

OTHER PUBLICATIONS

International Preliminary Report on Patentability, and Translation of Written Opinion of the International Searching Authority, dated May 23, 2013, for International Application No. PCT/JP2011/073658. (Forms PCT/IB/338, PCT/IB/373 and PCT/ISA/237).

Chinese Office Action for corresponding Chinese Application No. 201180051887.1 dated Jan. 13, 2014.

Taiwanese Office Action for corresponding Application No. 100138035 dated Nov. 14, 2013.

(a)

(b)

PROCESS FOR PRODUCING POLYCONDENSATION POLYMER, AND POLYMERIZER

TECHNICAL FIELD

The present invention relates to a method for producing a condensation polymerization reaction polymer, and to a polymerization reactor. More specifically, it relates to a wire guide having a specific structure for polymerization of a molten prepolymer as a precursor for a condensation polymerization reaction polymer, to an industrial production method wherein the wire guide is employed for polymerization of the molten prepolymer to achieve highly efficient production, at a high polymerization rate, of a high quality polymer having low fisheyes and excellent molecular weight stability, and to a polymerization reactor for the method.

BACKGROUND ART

Condensation polymerization reaction polymers are used in a wide variety of fields of resins that are in high demand as engineering plastics, including polycarbonates and polyamides, and polyester-based resins used in PET bottles. For example, aromatic polycarbonates are engineering plastics with excellent transparency and heat resistance, as well as excellent mechanical strength including impact strength, and they are widely used for industrial purposes including optical disks, electrical and electronic fields, automobiles, and the like. This has led to a worldwide demand exceeding 3 million tons per year, with continuously increasing growth.

Aromatic polycarbonates are industrially produced by interfacial polycondensation methods using aromatic dihydroxy compounds (for example, 2,2-bis(4-hydroxyphenyl)propane (hereunder referred to as "bisphenol A") and phosgene as starting materials.

On the other hand, methods for producing aromatic polycarbonates from aromatic dihydroxy compounds and diaryl carbonates are also known, and include transesterification methods in which an aromatic dihydroxy compound (for example, bisphenol A) and a diaryl carbonate (for example, diphenyl carbonate) are transesterified in a molten state, and polymerization is carried out while removing out the aromatic monohydroxy compound (for example, phenol) that is produced. Transesterification methods are advantageous in that they do not use solvents, unlike interfacial polycondensation methods, but they are also associated with certain problems. Namely, the transesterification reaction is an equilibrium reaction with a low equilibrium constant, and therefore polymerization does not proceed unless the aromatic monohydroxy compound (for example, phenol) that is produced is efficiently removed from the surface of the molten product. In addition, the polymer viscosity increases abruptly at a certain point in the polymerization process, making it difficult to efficiently remove the aromatic monohydroxy compound by-product (for example, phenol) out of the system, and presenting a fundamental problem that prevents a high polymerization degree from being obtained.

Various types of polymerization reactors have conventionally been known for production of aromatic polycarbonates by transesterification methods. For example, some known methods employ vertical-type stirred-tank polymerization reactors equipped with stirrers. On small scales, such vertical-type stirred-tank polymerization reactors have high volumetric efficiency, are simple and allow efficient polymerization to proceed, but on an industrial scale, vertical-type stirred-tank polymerization reactors can only be used for production of prepolymers with a low polymerization degree. Some methods are known for solving these problems, such as a method using a screw-type polymerization reactor with a vent (Patent document 1), a method using an intermeshing twin-screw extruder (Patent document 2), a method using a thin-film evaporating reactor such as a screw evaporator or a centrifugal-film evaporator (Patent document 3), and a method using a combination of a centrifugal-film evaporator and a horizontal twin-screw stirring polymerization reactor (Patent document 4).

These methods, however, are all based on mechanical stirring technology and are limited in the polymerization degree of the polycarbonate that can be produced, while they are poorly suited for production of high-molecular-weight aromatic polycarbonates that are widely used for sheet purposes, and therefore numerous problems remain to be resolved.

The present inventors have already published our findings that such problems can be completely solved by developing methods using a guide-contact fluidized polymerization apparatus wherein a molten prepolymer is polymerized while dropping by its own weight along a guide such as a wire, without carrying out mechanical stirring (Patent documents 5-14). Such methods are excellent for production of aromatic polycarbonates.

CITATION LIST

Patent Literature

[Patent document 1] Japanese Examined Patent Application Publication SHO No. 50-19600
[Patent document 2] Japanese Examined Patent Application Publication SHO No. 52-36159
[Patent document 3] Japanese Examined Patent Application Publication SHO No. 53-5718
[Patent document 4] Japanese Unexamined Patent Application Publication HEI No. 02-153923
[Patent document 5] Japanese Unexamined Patent Application Publication HEI No. 08-225641
[Patent document 6] Japanese Unexamined Patent Application Publication HEI No. 08-225643
[Patent document 7] Japanese Unexamined Patent Application Publication HEI No. 08-325373
[Patent document 8] International Patent Publication No. WO97/22650
[Patent document 9] Japanese Unexamined Patent Application Publication HEI No. 10-81741
[Patent document 10] Japanese Unexamined Patent Application Publication HEI No. 10-298279
[Patent document 11] International Patent Publication No. WO99/36457
[Patent document 12] International Patent Publication No. WO99/64492
[Patent document 13] International Patent Publication No. WO2005/121210
[Patent document 14] International Patent Publication No. WO2005/035620

SUMMARY OF INVENTION

Technical Problem

As worldwide demand for aromatic polycarbonates has exceeded 3 million tons per year and production volume continues to increase, as mentioned above, development of means and polymerization reactors for production of aromatic polycarbonates with even higher polymerization rates is desired.

It is therefore an object of the present invention to provide a method for producing a condensation polymerization reaction polymer, wherein a molten prepolymer as a precursor for a condensation polymerization reaction polymer is polymerized, and a high-quality condensation polymerization reaction polymer with excellent molecular weight stability is efficiently produced at a high polymerization rate, as well as a wire guide and a polymerization reactor for production of a condensation polymerization reaction polymer.

Solution to Problem

The present inventors have conducted much diligent research with the aim of solving the problems described above. Specifically, the method for producing a condensation polymerization reaction polymer of the invention is distinguished by the following [1] to [15].

[1] A method for producing a condensation polymerization reaction polymer, comprising a guide polymerization step in which a molten prepolymer is supplied to the top edge of a wire guide in a polymerization reactor for production of a condensation polymerization reaction polymer, and is allowed to drop while contacting the wire guide in conducting polymerization of the molten prepolymer to obtain the condensation polymerization reaction polymer, the wire guide comprising a vertical wire group consisting of a plurality of vertical wires extending in the vertical direction, which are mutually spaced in alignment at an arrangement pitch L1 (mm), wherein:

in the guide polymerization step, the molten prepolymer supplied from the top edge of the wire guide aggregates so that a molten prepolymer mass is formed on the vertical wire, and a molten prepolymer mass is formed wherein, the width of the molten prepolymer mass measured in an alignment direction of the vertical wires at a position 200 mm below the top edge being represented as L (mm), the width L2 (mm) of at least a portion of the molten prepolymer mass satisfies the relationship with L1 (mm) as defined by inequality (1).

$$L1 < L2 \tag{1}$$

[2] The method according to [1], wherein L2 is at least 3-fold of L1.

[3] The method according to [1] or [2], wherein the wire guide comprises a plurality of anchoring wires that link the plurality of vertical wires of the vertical wire group and anchor a positional relationship between the vertical wires, and an arrangement pitch L5 (mm) of the anchoring wires is at least 1.5-fold of L1, and L1 is 3-20 mm.

[4] The method according to any one of [1] to [3], wherein:

the total area of the wire guide as seen from a horizontal direction perpendicular to an alignment direction of the vertical wires being represented as S1 (mm²), the average thickness of the molten prepolymer mass formed on the wire guide being represented as T2 (mm), and considering a section of the molten prepolymer mass having a thickness of no greater than ⅓ of T2 as thin sections, the area of the thin sections as seen from the horizontal direction perpendicular to the alignment direction of the vertical wires being represented by S2 (mm²), the relationship between S1 and S2 satisfies inequality (7).

$$(S2/S1) < 0.05 \tag{7}$$

[5] The method according to any one of [1] to [4], wherein the relationship between a viscosity η (poise) of the molten prepolymer supplied to the top edge of the wire guide and L1 (mm) satisfies inequality (4).

$$1 < L1 < 0.11 \times \eta + 15 \tag{4}$$

[6] The method according to any one of [1] to [5], wherein the condensation polymerization reaction polymer is an aromatic polycarbonate.

The wire guide for production of a condensation polymerization reaction polymer according to the invention is distinguished by the following [7] to [10].

[7] A wire guide for production of a condensation polymerization reaction polymer, wherein in a polymerization reactor for production of a condensation polymerization reaction polymer, a polymerization material composed of a molten prepolymer is allowed to drop down while in contact therewith, for polymerization of the polymerization material, and a condensation-polymerizable polymer is obtained, the wire guide comprising a vertical wire group consisting of a plurality of vertical wires that extend in the vertical direction and are mutually spaced in alignment, and an anchoring wire that links the plurality of vertical wires of the vertical wire group and anchors a positional relationship between the vertical wires, wherein, assuming a tabular virtual space containing the vertical wire group while extending in an alignment direction of the vertical wires, and delineation by a pair of virtual vertical planes sandwiching the vertical wire group, the anchoring wire extends along a virtual vertical plane outside of the virtual space while being anchored to the plurality of vertical wires of the vertical wire group on the virtual vertical plane.

[8] A wire guide for production of a condensation polymerization reaction polymer according to [7], wherein the anchoring wire is present only on the side of one of the virtual vertical planes of the virtual space.

[9] A wire guide for production of a condensation polymerization reaction polymer according to [7] or [8], wherein the wire guide comprises a plurality of anchoring wires, an arrangement pitch L5 (mm) of the anchoring wires is at least 1.5-fold as long as an arrangement pitch L1 (mm) of the vertical wires, and L1 is 3-20 mm.

[10] A wire guide for production of a condensation polymerization reaction polymer according to any one of [7] to [9], wherein the condensation polymerization reaction polymer is an aromatic polycarbonate.

The polymerization reactor of the invention is distinguished by the following [11] to [13].

[11] A polymerization reactor for production of a condensation polymerization reaction polymer, the polymerization reactor comprising a starting material feed port, a starting material feed zone communicating with the starting material feed port, a guide-contacted dropping polymerization reaction zone located at a lower section of the starting material feed zone and communicating with the starting material feed zone, and a polymer discharge port located at a lower section of the guide-contacted dropping polymerization reaction zone, wherein:

the guide-contacted dropping polymerization reaction zone is provided with a wire guide that allows the polymerization material supplied from the starting material feed zone to drop down while in contact therewith for polymerization of the polymerization material, and the wire guide is a wire guide for production of a condensation polymerization reaction polymer according to any one of [7] to [10].

[12] A polymerization reactor according to [11] which is provided with a plurality of wire guides, the wire guides being arranged in an arrangement pitch of L3 (mm) in a direction perpendicular to an alignment direction of the vertical wires, where the relationship between L1 and L3 satisfies inequality (2).

$$2 \times L1 < L3 \quad (2)$$

[13] A polymerization reactor according to [11] or [12], comprising a plurality of polymer feed holes that are provided at the top edge of the polymerization reaction zone in which the wire guide is housed and that feed the molten prepolymer to the top edge of the wire guide, wherein:

the polymer feed holes are arranged at an arrangement pitch of L4 (mm) in an alignment direction of the vertical wires, vertically above the wire guide, and the relationship between L4 and L1 satisfies inequality (3).

$$L4 > L1 \quad (3)$$

According to another aspect, the method for producing a condensation polymerization reaction polymer of the invention is distinguished by the following [14] and [15].

[14] A method for producing a condensation polymerization reaction polymer wherein a polymerization material composed of a molten prepolymer is allowed to drop down in a polymerization reactor while in contact with a wire guide extending in the vertical direction, for polymerization of the polymerization material, to obtain a condensation polymerization reaction polymer, wherein the wire guide is a wire guide for production of a condensation polymerization reaction polymer according to any one of [7] to [10].

[15] The method according to any one of [1] to [6], which is a method for producing a condensation polymerization reaction polymer in which, in a polymerization reactor for production of a condensation polymerization reaction polymer, a wire guide for production of a condensation polymerization reaction polymer is employed whereby a polymerization material composed of a molten prepolymer is allowed to drop down while in contact therewith, for polymerization of the polymerization material, and a condensation-polymerizable polymer is obtained, the method employing a wire guide comprising a vertical wire group consisting of a plurality of vertical wires that extend in the vertical direction and are mutually spaced in alignment, and an anchoring wire that links the plurality of vertical wires of the vertical wire group and anchors a positional relationship between the vertical wires, wherein, assuming a tabular virtual space containing the vertical wire group while extending in an alignment direction of the vertical wires, and delineation by a pair of virtual vertical planes sandwiching the vertical wire group, the anchoring wire extends along a virtual vertical plane outside of the virtual space while being anchored to the plurality of vertical wires of the vertical wire group on the virtual vertical plane, and lies only on the side of one of the virtual vertical planes of the virtual space.

Advantageous Effects of Invention

According to the invention it is possible to efficiently produce a high-quality condensation polymerization reaction polymer with excellent molecular weight stability at a high polymerization rate, and by using a specific wire guide for production of a condensation polymerization reaction polymer, it is possible to achieve reduction in fisheyes.

DESCRIPTION OF EMBODIMENTS

Figure 1:
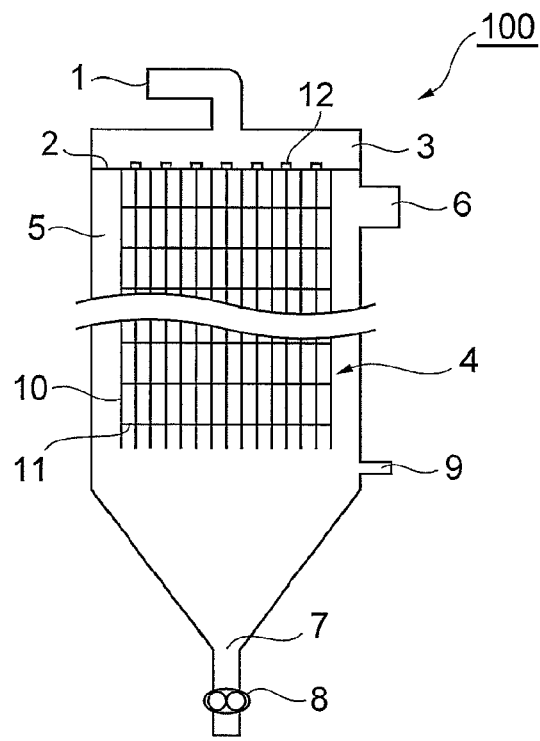
FIG. 1(a) is a schematic diagram showing a polymerization reactor according to one embodiment of the invention.
FIG. 1(b) is a diagram showing a state where a molten prepolymer mass is dropping down on a wire guide as a "sheet".
Figure 1:
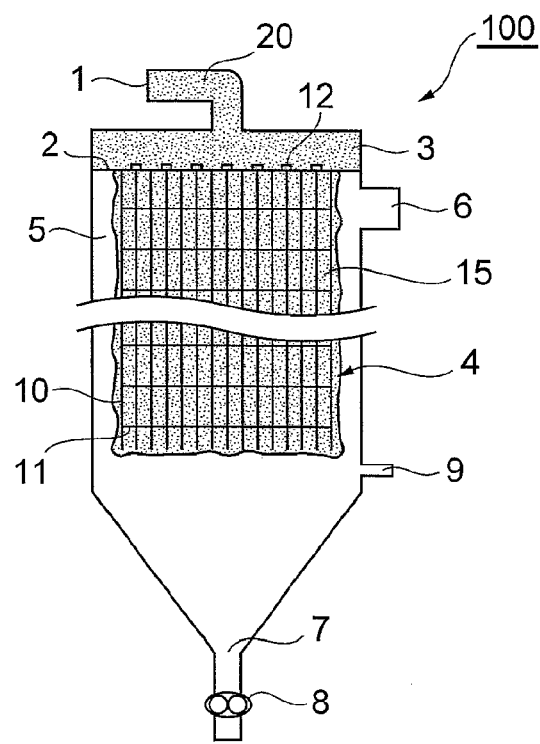

Preferred embodiments of the invention will now be described in detail.

For the purpose of the invention, a "condensation polymerization reaction polymer" is a polymer produced by polymerization that takes place as a reaction proceeds between the functional groups of two molecules and a low molecular weight molecule dissociates, and it includes, specifically, polycarbonate resins, polyamide resins, polyesters and the like. Polyester resins include polyethylene terephthalate (PET), polybutylene terephthalate (PBT) and polytrimethylene terephthalate (PTT). A typical example of a polycarbonate resin is an aromatic polycarbonate obtained by reacting an aromatic hydroxy compound with a diaryl carbonate.

The aromatic dihydroxy compound may be a single type or two or more different types. A typical example of an aromatic dihydroxy compound is bisphenol A, and when it is used together with another aromatic dihydroxy compound, bisphenol A is preferably used in a proportion of at least 85 mol % with respect to the entire amount of aromatic dihydroxy compounds. These aromatic dihydroxy compounds preferably have minimally low contents of chlorine and alkali or alkaline earth metals, and if possible they are preferably essentially free of such elements (100 ppb or less).

As diaryl carbonates there are preferred symmetrical diaryl carbonates including unsubstituted diphenyl carbonates and lower alkyl-substituted diphenyl carbonates such as ditolyl carbonate and di-t-butylphenyl carbonate, with diphenyl carbonate being more preferred. These diaryl carbonates may be used alone or in combinations of two or more. These diaryl carbonates preferably have minimally low contents of chlorine and alkali or alkaline earth metals, and if possible they are preferably essentially free of such elements (100 ppb or less).

The proportion of the aromatic dihydroxy compound and diaryl carbonate used (the charging ratio) will depend on the type of aromatic dihydroxy compound and diaryl carbonate used, the target molecular weight, the hydroxyl termination ratio and the polymerization conditions, and it is not particularly restricted. The diaryl carbonate may be used in a proportion of preferably 0.9-2.5 mol, more preferably 0.95-2.0 mol and even more preferably 0.98-1.5 mol with respect to 1 mol of the aromatic dihydroxy compound. According to the invention, an aromatic monohydroxy compound such as phenol, t-butylphenol or cumylphenol may also be used in combination for terminal conversion or molecular weight modification.

Also according to the invention, a polyfunctional compound may be used in combination to introduce a branched structure into the condensation polymerization reaction polymer, to an extent that does not interfere with the object of the invention. When an aromatic carbonate branched polymer is to be produced, for example, the amount of polyfunctional compound used, such as a trivalent aromatic trihydroxy compound, is preferably 0.2-1.0 mol %, more preferably 0.2-0.9 mol % and even more preferably 0.3-0.8 mol % with respect to the aromatic dihydroxy compound.

Production of a condensation polymerization reaction polymer can be accomplished without addition of a polymerization catalyst, but for an increased polymerization rate it is preferably accomplished in the presence of a catalyst as necessary. When a catalyst is used, it may be of a single type or a combination of two or more types. The amount of a catalyst used for production of an aromatic polycarbonate is selected in the range of, for example, between $10^{-8}$ and 1 part by weight and preferably between $10^{-7}$ and $10^{-1}$ part by weight, with respect to 100 parts by weight of the aromatic dihydroxy compound starting material.

When the condensation polymerization reaction polymer obtained according to the invention is an aromatic polycarbonate, its number-average molecular weight is in the range of 500-100,000 and preferably 2,000-30,000. Measurement of the number-average molecular weight for the purpose of the invention can be accomplished by gel permeation chromatography (GPC).

According to the invention, a "molten prepolymer" is the melt during polymerization, obtained from an aromatic dihydroxy compound and a diaryl carbonate, for example, and having a lower molecular weight than an aromatic polycarbonate with the target number-average molecular weight. That is, it sometimes refers to the polymerization material introduced into the polymerization reactor, and sometimes refers to a polymer of increased molecular weight after a certain extent of polymerization reaction has taken place in the polymerization reactor. The molten prepolymer may also be an oligomer. Since a mixture of an aromatic dihydroxy compound and a diaryl carbonate will undergo reaction simply by hot melting alone, the mixture is essentially a molten prepolymer. The number-average molecular weight of the molten prepolymer used for the invention may be any value so long as melting occurs at the polymerization temperature, and it will differ depending on the chemical structure, but for most purposes it is in the range of at least 500 and less than 100,000. The value is preferably at least 500 and less than 10,000. It is more preferably at least 1000 and less than 8,000. Such a molten prepolymer to be used as a polymerization material for the invention may be obtained by any known method.

FIG. 1 is a schematic diagram showing a polymerization reactor according to one embodiment of the invention. The polymerization reactor 100 is a guide-contacted dropping polymerization reactor wherein guide-contacted dropping polymerization of the polymerization material can be accomplished by allowing the polymerization material to drop down a wire guide for production of a condensation polymerization reaction polymer (hereunder referred to simply as "wire guide"), while in contact therewith. The polymerization reactor 100 comprises a starting material feed port 1, a starting material feed zone 3 communicating with the starting material feed port 1, a guide-contacted dropping polymerization reaction zone 5 located under the starting material feed zone 3 and communicating with the starting material feed zone 3, and a polymer discharge port 7 located at a lower section of the guide-contacted dropping polymerization reaction zone 5. A wire guide 4 is situated in the reaction zone 5. The wire guide 4 is a combination of a plurality of vertical wires 10 extending in the vertical direction and anchoring wires 11 extending in a horizontal direction, the details of which are explained below.

The guide-contacted dropping polymerization reactor (hereunder also referred to simply as "polymerization reactor") will now be explained in greater detail with reference to FIG. 1(a). The explanation assumes that the condensation polymerization reaction polymer is an aromatic polycarbonate. The molten prepolymer 20 is supplied from the starting material feed port 1 to the polymerization reactor 100. The supplied molten prepolymer 20 is transported to the starting material feed zone 3 above a distributing plate 2 and is then transported through polymer feed holes 12 formed in the distributing plate 2 to the guide-contacted dropping polymerization reaction zone 5 in which the wire guide 4 is held. The molten prepolymer 20 is fed to the top edge of the wire guide 4, and allowed to drop down under its own weight while contacting along the vertical wires 10 of the wire guide 4. A monohydroxy compound (for example, phenol) as a by-product of the polymerization reaction is removed out through a vacuum vent port 6 to allow the polymerization reaction to proceed, and an aromatic polycarbonate is produced. The aromatic polycarbonate is removed by a discharge pump 8, through a polymer discharge port 7 situated at the lower section.

When the molten prepolymer 20 drops down by its own weight while contacting the wire guide 4, at least a portion of the molten prepolymer 20 contacts and aggregates with the molten prepolymer 20 that is dropping down while in contact with adjacent vertical wires 10, thus forming a molten prepolymer mass 15 (see FIG. 1(b)). Also, as this contact and aggregation of the molten prepolymer 20 between the vertical wires 10 spreads across virtually the entire surface of the wire guide 4, the molten prepolymer mass 15 drops down with the appearance of a "sheet" over the entire wire guide 4, instead of as "lines" along each of the vertical wires 10. The "appearance of a sheet" exhibited by the molten prepolymer mass 15 is a state in which the molten prepolymer mass 15 is seen to be straddling the plurality of vertical wires 10, such that the molten prepolymer mass 15 has a vertically flat shape that is parallel to an alignment direction of the vertical wires 10. FIG. 1(b) shows a state where the molten prepolymer mass 15 is dropping down as a "sheet" on the wire guide 4.

According to this embodiment, the molten prepolymer 20 discharged from the polymer feed holes 12 contacts and aggregates together, resulting in interaction of the molten prepolymer 20 in the horizontal direction, thus allowing a uniform dropping state to be obtained in the horizontal direction. Since the molten prepolymer 20 as a whole drops at a more uniform rate than when the molten prepolymer 20 drops down independently on each individual vertical wire 10, it is possible to obtain a more uniform residence time for the molten prepolymer 20 in the polymerization reactor, thereby allowing highly efficient production of a polymer with a homogeneous number-average molecular weight. Furthermore, as the degree of contact and aggregation of the molten prepolymer 20 dropping down along adjacent vertical wires 10 increases, this has been thought to reduce the surface area of the monohydroxy compound by-product (such as phenol) that must be removed in the polymerization reaction, and significantly lower the polymerization rate, but since the amount of molten prepolymer 20 supplied to the wire guide 4 can be increased without significantly lowering the polymerization rate itself, the productivity is drastically improved and density of the molten prepolymer 20 per cross-sectional area unit of the polymerization reactor can be increased, while the productivity can be greatly improved compared to when the molten prepolymer 20 is allowed to independently drop down in contact with the individual vertical wires 10.

Figure 2:
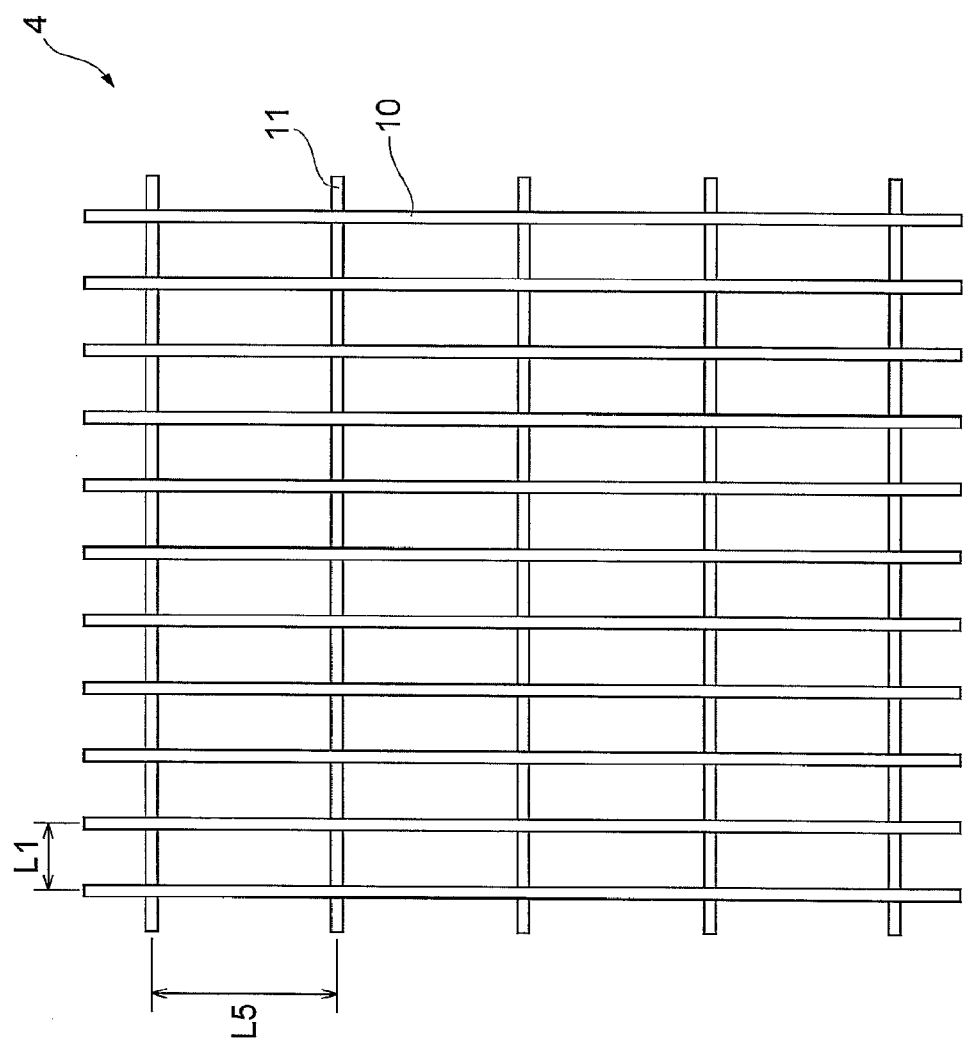
FIG. 2 is a diagram showing a wire guide according to an embodiment of the invention.

FIG. 2 shows an embodiment of a wire guide 4 according to the invention. The wire guide 4 comprises at least 3 vertical wires 10 mutually spaced and aligned in an arrangement pitch L1 (mm) (Hereunder, this plurality of vertical wires 10 will be collectively referred to as "vertical wire group".). The term "arrangement pitch" refers to the center distance between wires.

The value of L1 is preferably 3-50 mm, more preferably 3-20 mm and even more preferably 5-15 mm. If it is above or below this range, the improvement in the polymerization rate and productivity will tend to be insufficient.

The proportion of the length of the wire guide 4 in the vertical direction with respect to the length in the horizontal direction is preferably at least 2-fold, more preferably at least 3-fold and even more preferably at least 5-fold. There are no particular restrictions on the size of the wire guide 4, and the total area of the surface will normally be in the range of 0.1-100 m$^2$ and preferably 0.4-20 m$^2$, for each wire guide. The terms "vertical" and "horizontal", relating to the directions in which the wire extends for this embodiment, are only fundamental concepts, and may each be slanted up to 10 degrees depending on the conditions of fabrication and installation of the wire guide. They are preferably slanted no more than 5 degrees.

As shown in FIG. 2, the wire guide 4 comprises anchoring wires 11 that link the plurality of vertical wires 10 and anchor a positional relationship between the vertical wires 10.

An arrangement pitch L5 (mm) of the anchoring wires is preferably 5-2000 mm, more preferably 10-500 mm, even more preferably 20-200 mm. Also, the anchoring wires 11 preferably lie along the horizontal direction. L5 is preferably at least 1.5-fold and more preferably at least 3-fold of L1. If L5 is at least 1.5-fold of L1, the molten prepolymer will tend to drop down uniformly, and fisheyes will be effectively reduced.

Substances to be used for the vertical wire 10 and anchoring wire 11 composing the wire guide 4 include stainless steel, titanium, nickel and the like, with stainless steel being particularly preferred. Surface treatment by plating or the like may be carried out to increase the metal corrosion resistance.

Figure 3:
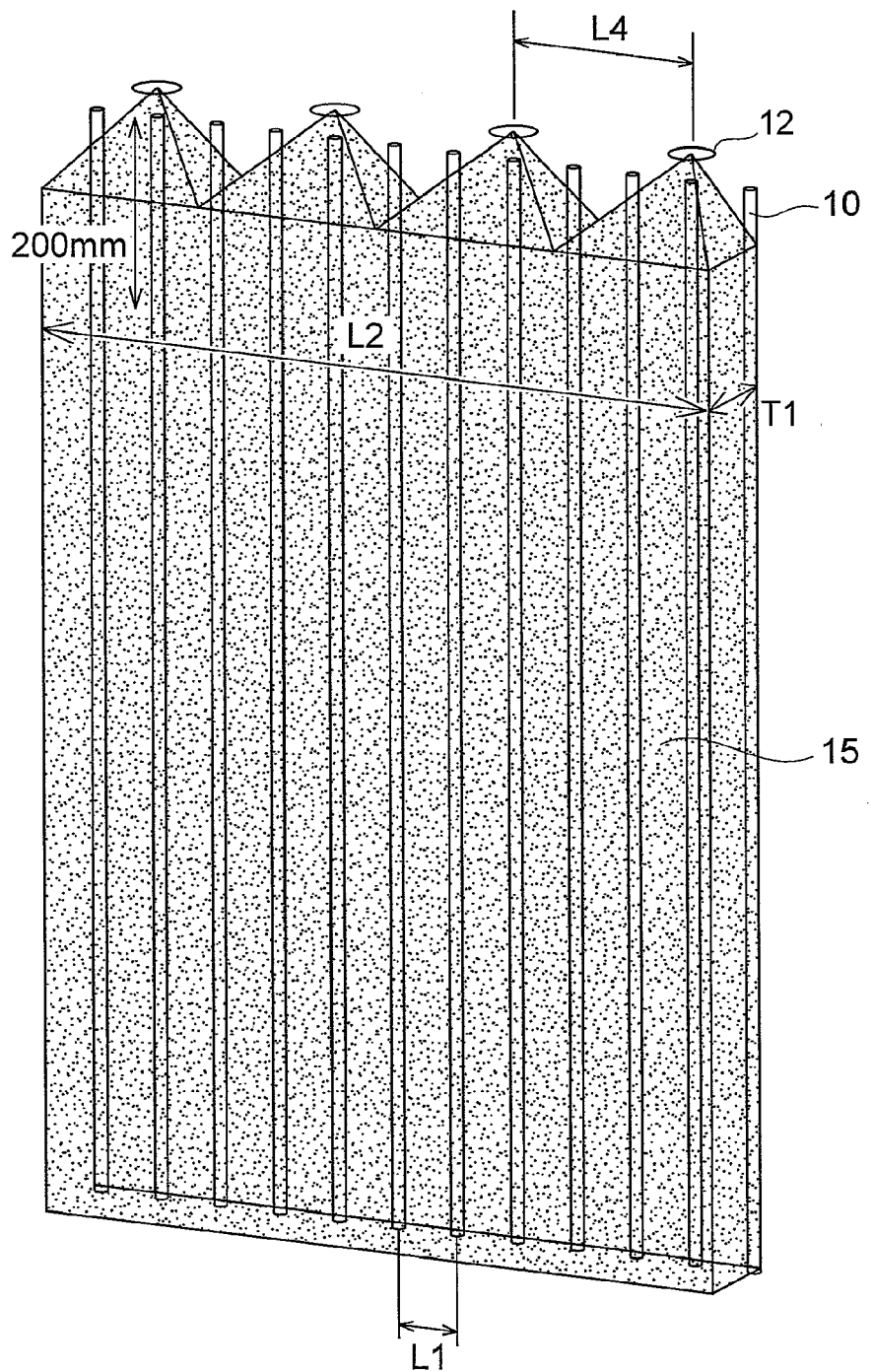
FIG. 3 is a schematic diagram showing polymer feed holes of a polymerization reactor of the invention, and a wire guide set in the polymerization reactor.

FIG. 3 is a schematic diagram showing the polymer feed holes 12 of a polymerization reactor 100 and a wire guide 4 set in the polymerization reactor 100. As shown in FIG. 3, at least one of the vertical wires 10 is preferably located directly below each of the polymer feed holes 12. The structure of the polymer feed holes 12 and the top edge of the wire guide may be such that the vertical wires 10 directly below the polymer feed holes 12 are either in contact therewith or separate from them. The molten prepolymer 20 is discharged through the plurality of polymer feed holes 12 formed in the distributing plate 2 located at the top of the wire guide 4, and polymerization proceeds while it drops down along the vertical wire 10. FIG. 3 has been drawn without showing the anchoring wires 11.

In this embodiment, L2 (mm) represents the width of the molten prepolymer mass 15 measured in the alignment direction of the vertical wires 10, at a position where the molten prepolymer 20 discharged from the plurality of polymer feed holes 12 has dropped 200 mm below the top edge of the wire guide 4, and the width L2 of at least a portion of the molten prepolymer mass 15 satisfies the relationship with L1 as defined by inequality (1).

$$L1 < L2 \tag{1}$$

The relationship between L1 and L2 is such that the value of L2 is at least 2-fold, preferably at least 3-fold, more preferably at least 5-fold and most preferably at least 10-fold of the value of L1. A molten prepolymer mass 15 satisfying inequality (1) attaches in a manner straddling the plurality of vertical wires 10 at a position 200 mm below the top edge of the wire guide 4.

The section satisfying inequality (1) at the position 200 mm from the top edge of the wire guide 4 is preferably 50% or greater, more preferably 80% or greater, even more preferably 95% or greater and most preferably 99% or greater. If inequality (1) is not satisfied, the width of the molten prepolymer mass 15 in the horizontal direction during dropping will be smaller than the arrangement pitch between the vertical wires 10, and the molten prepolymer mass 15 will drop down independently along the individual vertical wires 10. The area of the wire guide 4, which essentially forms a surface, is the area of the surface surrounding the outer frame region of the vertical wire.

The arrangement pitch L1 of the vertical wires 10 is preferably designed so that the molten prepolymer 20 contacts and aggregates together during the polymerization process, and the molten prepolymer mass 15 on the wire guide 4 exhibits the appearance of a "sheet". A correlation exists between a viscosity η of the molten prepolymer 20 discharged from the polymer feed hole 12 and the diameter of the molten prepolymer mass 15 dropping down the vertical wires 10, with a larger viscosity resulting in a greater diameter. The design is preferably such that the relationship between the arrangement pitch L1 of the vertical wires 10 and the viscosity η (poise) of the molten prepolymer 20 upon discharge from the polymer feed hole 12 satisfies inequality (4).

$$1 < L1 < 0.11\eta + 15 \tag{4}$$

The design is more preferably such that inequality (5) is satisfied.

$$1 < L1 < 0.02\eta + 10 \tag{5}$$

Since 10 poise=1 Pascal·s (Pa·s), inequality (4) and inequality (5) can be converted to the following, in terms of the viscosity represented in SI units of η'.

$$1 < L1 < 1.1\eta' + 15 \tag{4'}$$

$$1 < L1 < 0.2\eta' + 10 \tag{5'}$$

By satisfying inequality (4) or (5) (or inequality (4') or (5')), the molten prepolymer mass 15 exhibits the appearance of a "sheet" on the wire guide 4.

Also, an inert gas is preferably absorbed into the molten prepolymer 20 before introduction into the polymerization reactor, so that expansion occurs during polymerization to increase the surface area. A specific method for absorbing an inert gas into the molten prepolymer 20 is the method described in International Patent Publication No. WO99/64492.

Figure 4:
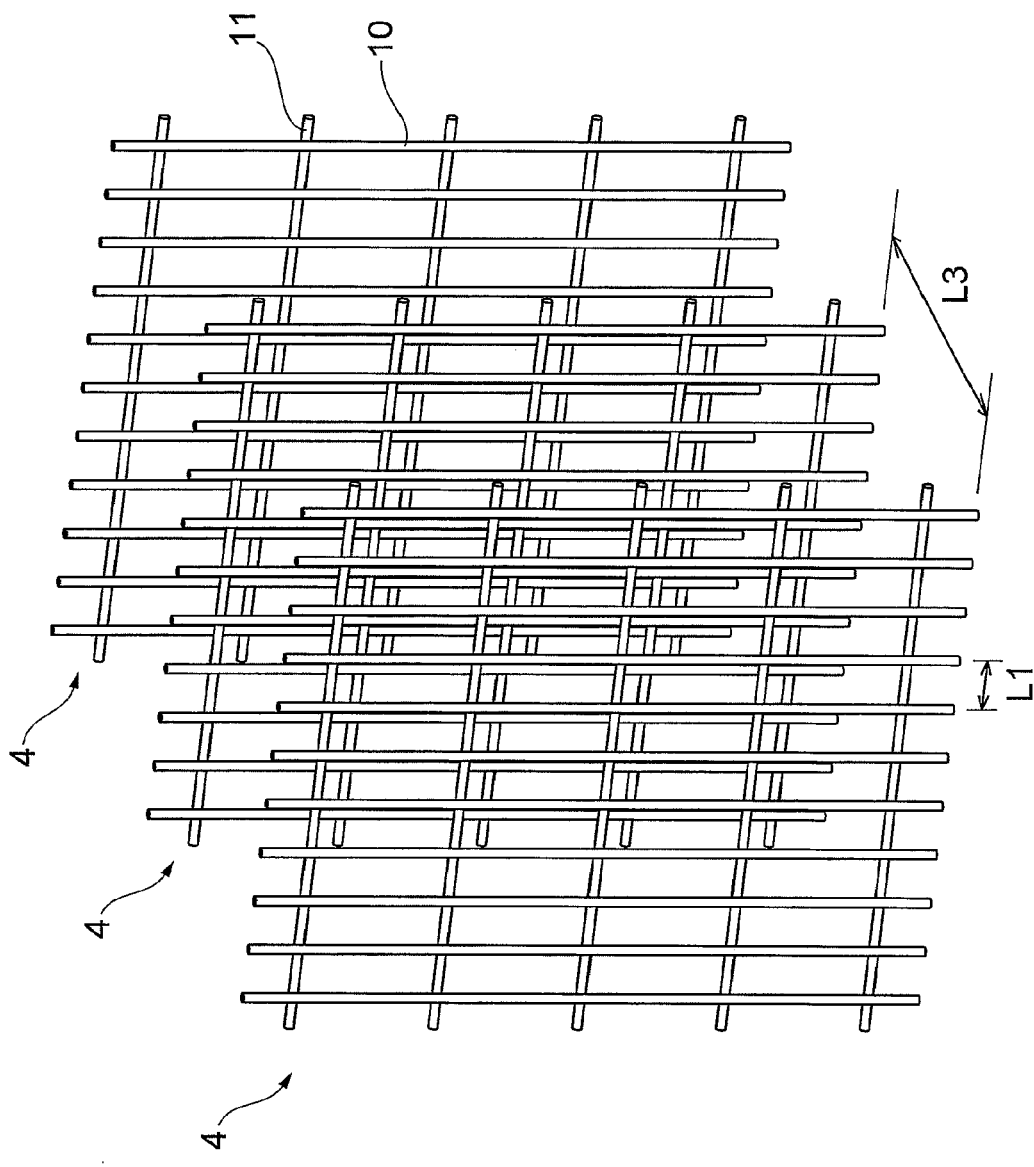
FIG. 4 is a diagram showing a wire guide in which a plurality of wire guides are essentially integrated, according to an embodiment of the invention.

A wire guide comprising a plurality of essentially integrated wire guides 4 may also be set in the guide-contacted dropping polymerization reaction zone 5. Specifically, as shown in FIG. 4, a wire guide with a 3-dimensional structure may be used, having a plurality of wire guides 4 arranged at an arrangement pitch of L3 (mm) in the direction perpendicular to the alignment direction of the vertical wires 10, and the spacing between each of the wire guides 4 being anchored with a supporting material (not shown). Since low-molecular by-products are produced during condensation polymerization in the condensation polymerization reaction, it is necessary to efficiently remove the low-molecular by-products from the polymer so as to promote the polymerization reaction. If the molten prepolymer mass 15 formed on the wire guide 4 contacts further becoming a large mass, such that the surface area is excessively reduced, it becomes no longer possible to efficiently remove the by-products. Therefore, when a plurality of wire guides 4 are linked together with a support in a three-dimensionally integrated fashion as described above, the individual wire guides 4 are preferably each situated at an arrangement pitch such that the dropping molten prepolymer masses 15 do not mutually contact.

In order to ensure that the molten prepolymer masses 15 do not mutually contact between different wire guides 4, the arrangement pitch L3 between the wire guides 4 is preferably as large as possible. From the viewpoint of production efficiency, however, L3 is preferably as small as possible as this will allow a large amount of molten prepolymer 20 to flow per unit cross-sectional area of the polymerization reactor.

The relationship between the arrangement pitch L3 between the wire guides 4 and the arrangement pitch L1 between the vertical wires 10 preferably satisfies inequality (2).

$$2 \times L1 < L3 < 20 \times L1 \quad (2)$$

Here, the preferred value of L3 varies depending on the value of L1. When L1 is at least 1 mm and less than 15 mm, the preferred range is $5 \times L1 < L3 < 15 \times L1$ and more preferably $7 \times L1 < L3 < 10 \times L1$. When L1 is at least 15 mm and less than 30 mm, the preferred range is $3 \times L1 < L3 < 10 \times L1$ and more preferably $4 \times L1 < L3 < 5 \times L1$. When L1 is at least 30 mm, the preferred range is $2 \times L1 < L3 < 8 \times L1$ and more preferably $2 \times L1 < L3 < 3 \times L1$.

Specifically, the value of L3 will usually be 10-300 mm, and is preferably 20-200 mm and more preferably 40-100 mm, at the section of nearest proximity of the wire guides 4. The plurality of wire guides 4 are preferably linked to a plurality of supports (wires or flat plates) for essential integration.

The structure of the wire guides 4 is important for this embodiment, and a design with the polymer feed holes 12 formed in the distributing plate 2 is the preferred form. The arrangement pitch of the plurality of formed holes (the center distance between the holes) has a major effect on the form of the polymer after it has dropped down on the wire guides 4, and therefore when they are arranged at an arrangement pitch of L4 (mm) in the alignment direction of the vertical wires 10, the relationship with L1 preferably satisfies inequality (3).

$$L4 > L1 \quad (3)$$

More preferably, n is an integer of 2-5 in the relationship $L4 > n \times L1$.

The relationship between L4 and L2 for the polymer feed holes 12 preferably satisfies inequality (6).

$$L4 < L2 \quad (6)$$

The shapes of the molten prepolymer mass 15 that appears as a "sheet" preferably satisfies inequality (8).

$$L2/T1 > 2 \quad (8)$$

Here, T1 represents the mean value of the thickness of the molten prepolymer mass 15 formed on the wire guide 4 at a location 200 mm below the top edge of the wire guide 4, as shown in FIG. 3.

L2/T1 is affected by the number and arrangement pitch of the vertical wires 10 in the wire guide 4, which essentially forms a plane. Specifically, a larger number and greater arrangement pitch of the vertical wires 10 results in greater area of the molten prepolymer mass 15 formed as the "sheet", and a greater value for L2/T1. From the viewpoint of production efficiency, the relationship is preferably L2/T1>5 and even more preferably L2/T1>10.

When the molten prepolymer mass 15 drops down on the wire guide 4 while exhibiting the appearance of a "sheet", the preferred form for the molten prepolymer 20 discharged from the polymer feed holes 12 is to be uniformly dropped in the horizontal direction. A polymerization proceeds, the viscosity of the molten prepolymer 20 increases, resulting in a slower dropping speed, but the residence time of the molten prepolymer 20 in the polymerization reactor is preferably constant. That is, there are preferably no sections with an excessively slow dropping speed or with accumulation due to halted dropping.

Figure 5:
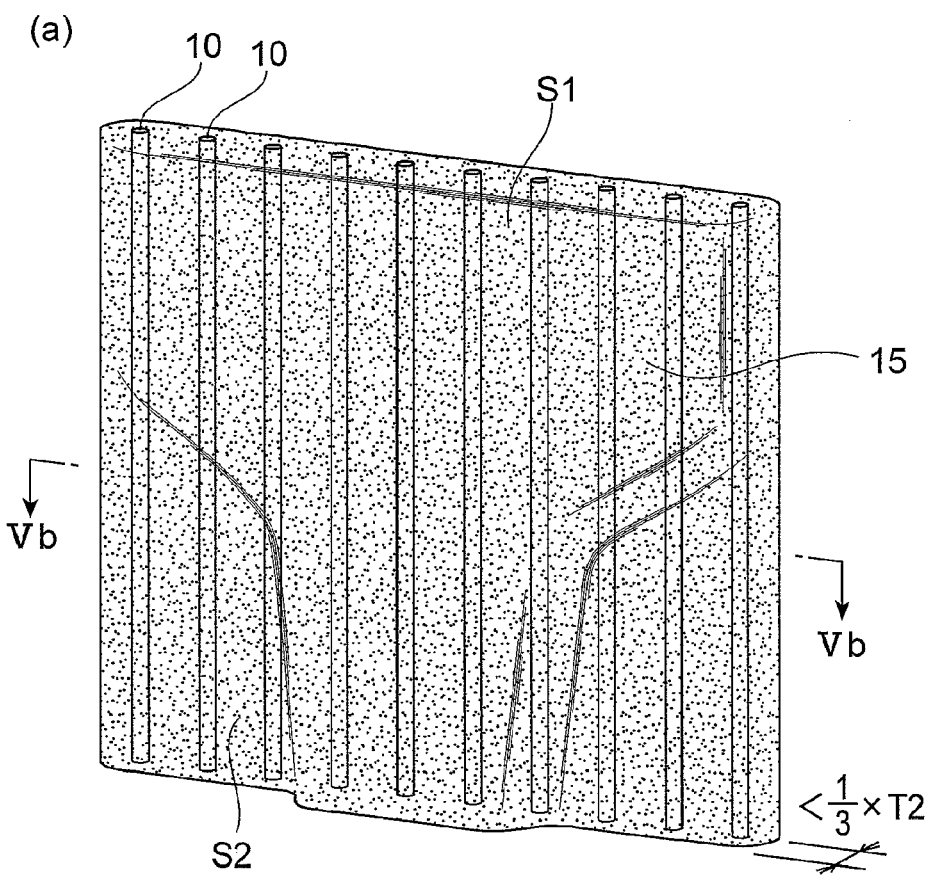
FIG. 5(a) is a diagram showing a molten prepolymer mass formed on a wire guide, and its thin sections.
FIG. 5(b) is a cross-sectional view along Vb-Vb of FIG. 5(a).
Figure 5:
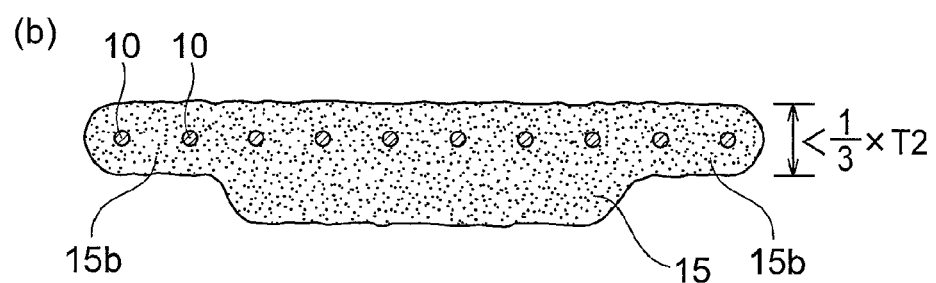

When the difference in dropping speed of the molten prepolymer mass 15 in a "sheet" state is partially increased, a difference in thickness of the molten prepolymer mass 15 may be produced at the sections of slow dropping, as shown in FIG. 5. In such cases, the relationship between S1 and S2 preferably satisfies inequality (7), where the total area of the wire guide 4 as seen from the horizontal direction perpendicular to the alignment direction of the vertical wires 10 is represented as S1, the average thickness of the molten prepolymer mass 15 formed on the wire guide 4 is represented as T2 (mm), and considering a section of the molten prepolymer mass 15 having a thickness of no greater than ⅓ of T2 as thin sections 15b, the area of the thin sections 15b as seen from the horizontal direction perpendicular to the alignment direction of the vertical wires 10 being represented by S2 (mm²).

$$(S2/S1) < 0.05 \quad (7)$$

The ratio (S2/S1) is more preferably less than 0.01 and even more preferably less than 0.001. When the molten prepolymer mass 15 at the thin sections 15b essentially ceases flowing, the molten prepolymer mass 15 at those sections forms accumulated sections. The thin sections 15b that have become accumulated sections preferably constitute less than 5%, more preferably no greater than 1% and even more preferably no greater than 0.1% of the entire wire guide. The area S2 is measured based on the wire spacing, by visual observation or by photography, through a view window provided in the polymerization reactor.

Figure 6:
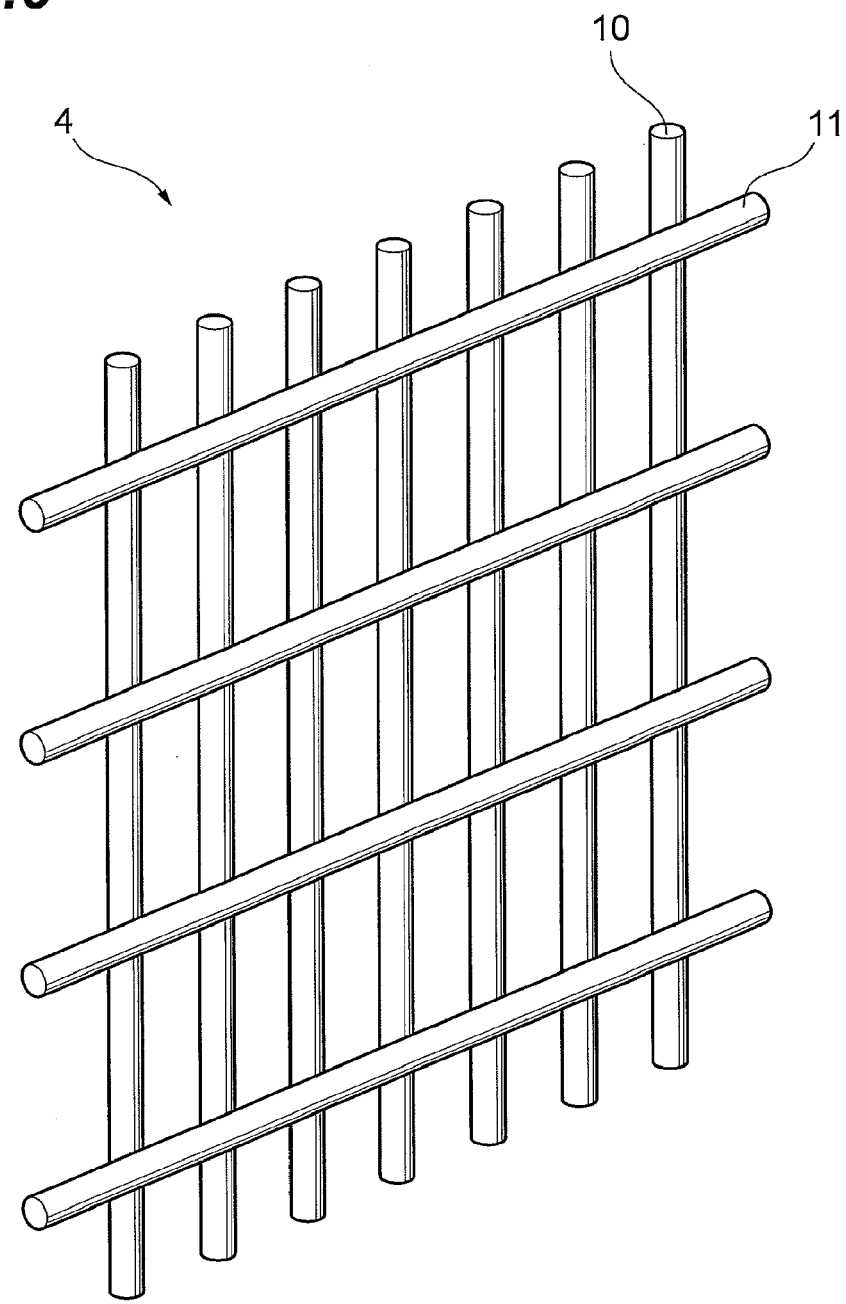
FIG. 6 is a diagram showing a wire guide according to an embodiment of the invention.
Figure 7:
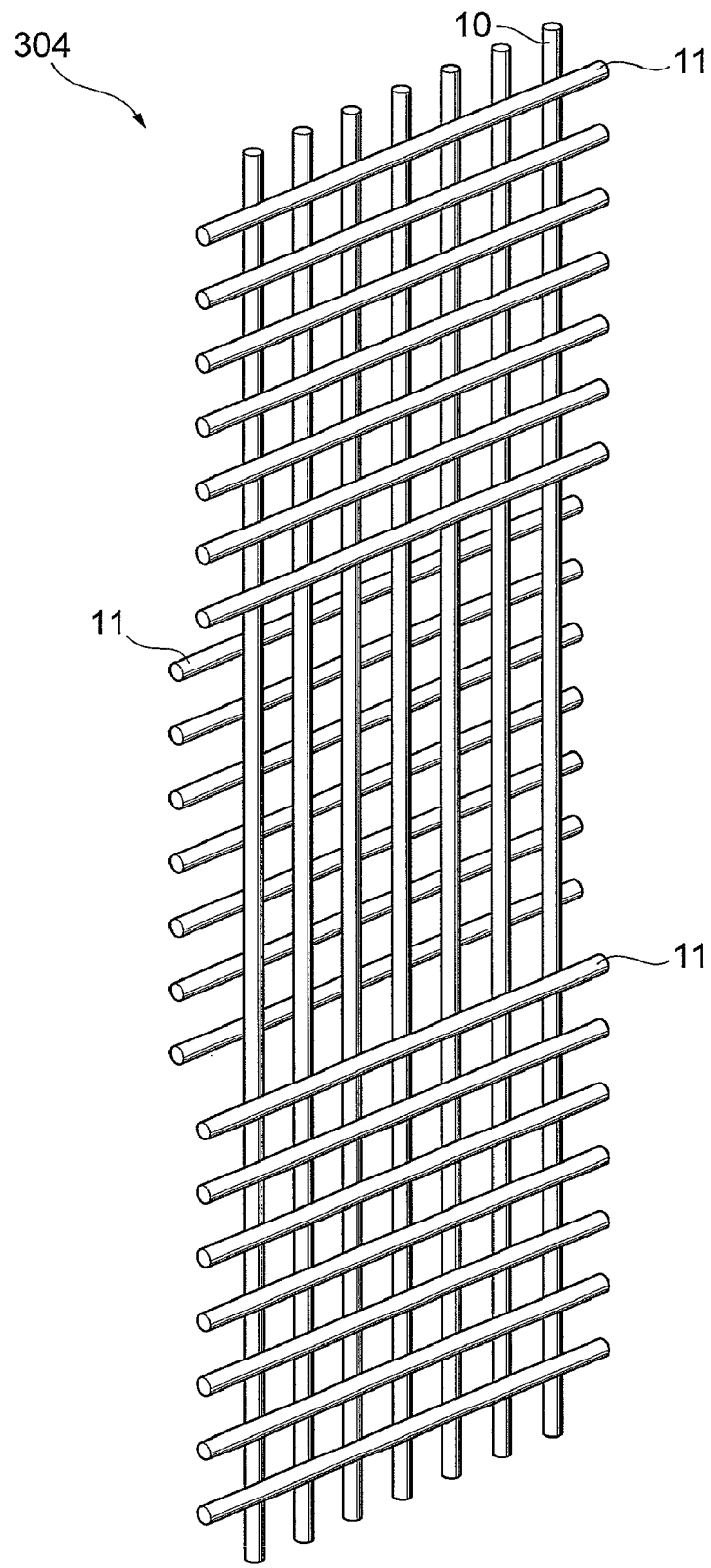
FIG. 7 is a diagram showing a wire guide according to an embodiment of the invention.

FIG. 6 to FIG. 10 show examples of wire guides that are combinations of vertical wires and anchoring wires. The wire guide 4 in FIG. 6 has a combination of anchoring wires 11 on one side of a vertical wire group formed by vertical wires 10. Preferred is a wire guide 4 comprising the anchoring wires 11 on one side of the vertical wire group, as shown in FIG. 6, or a wire guide as shown in FIG. 7, wherein the anchoring wires 11 are consecutively formed on different sides, with the wire guide 4 of FIG. 6 being especially preferred. In the wire guides shown in FIG. 6 and FIG. 7, the sections where the vertical wires 10 and anchoring wires 11 contact can be mutually anchored by welding or the like.

The cross-sectional shapes of the vertical wires 10 and anchoring wires 11 may be circular, elliptical or quadrilateral or other polygonal shapes, but circular cross-sections are generally preferred. The wire diameters are preferably 0.1 mm-10 mm and more preferably 1-5 mm. The diameters of the vertical wires and anchoring wires may be the same or different. Preferably, the diameters of the anchoring wires are 0.1-3-fold and more preferably 0.5-2-fold of the diameters of the vertical wires. Within this range, the wire guide strength will be sufficient and the molten prepolymer will maintain a uniform flow property.

Figure 11:
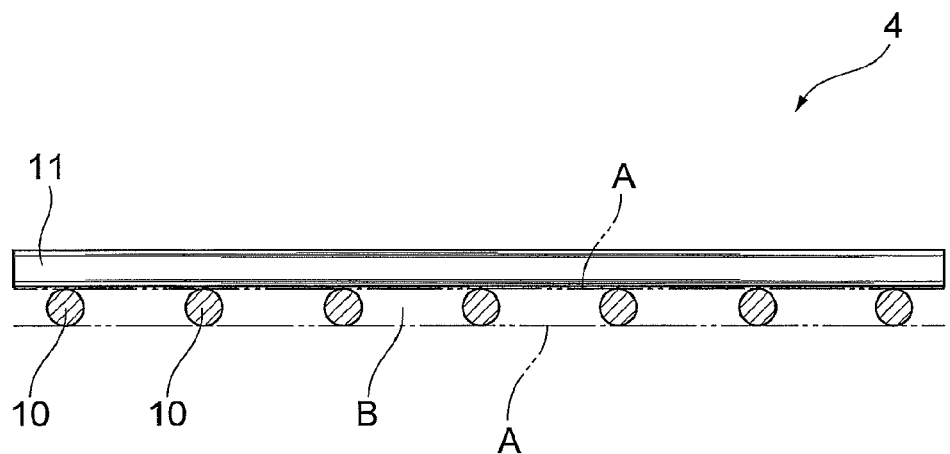
FIG. 11 is a horizontal cross-sectional view of a wire guide according to an embodiment of the invention.

The wire guide structure of the invention may be one such as shown in FIG. 11 (a horizontal cross-sectional view of a wire guide 4), wherein, assuming a tabular virtual space B that contains the vertical wire group while extending in the alignment direction of the vertical wires 10, and delineation by a pair of virtual vertical planes A sandwiching the vertical wire group, each anchoring wire 11 extends along the virtual vertical plane A on the outside of the virtual space B, while being anchored to the plurality of vertical wires 10 of the vertical wire group in the virtual vertical plane A. Typically, the anchoring wires 11 will not be present in the virtual space B. The wire guides 4, 304 are included as such wire guides. A wire guide with such a structure will have greatly increased polymerization power per unit time.

The effect will be greater when the anchoring wires are on one side of the vertical wire group (see FIG. 6, for example) than when they are on both sides.

The virtual vertical plane A may be flat or curved, but is preferably flat.

Figure 8:
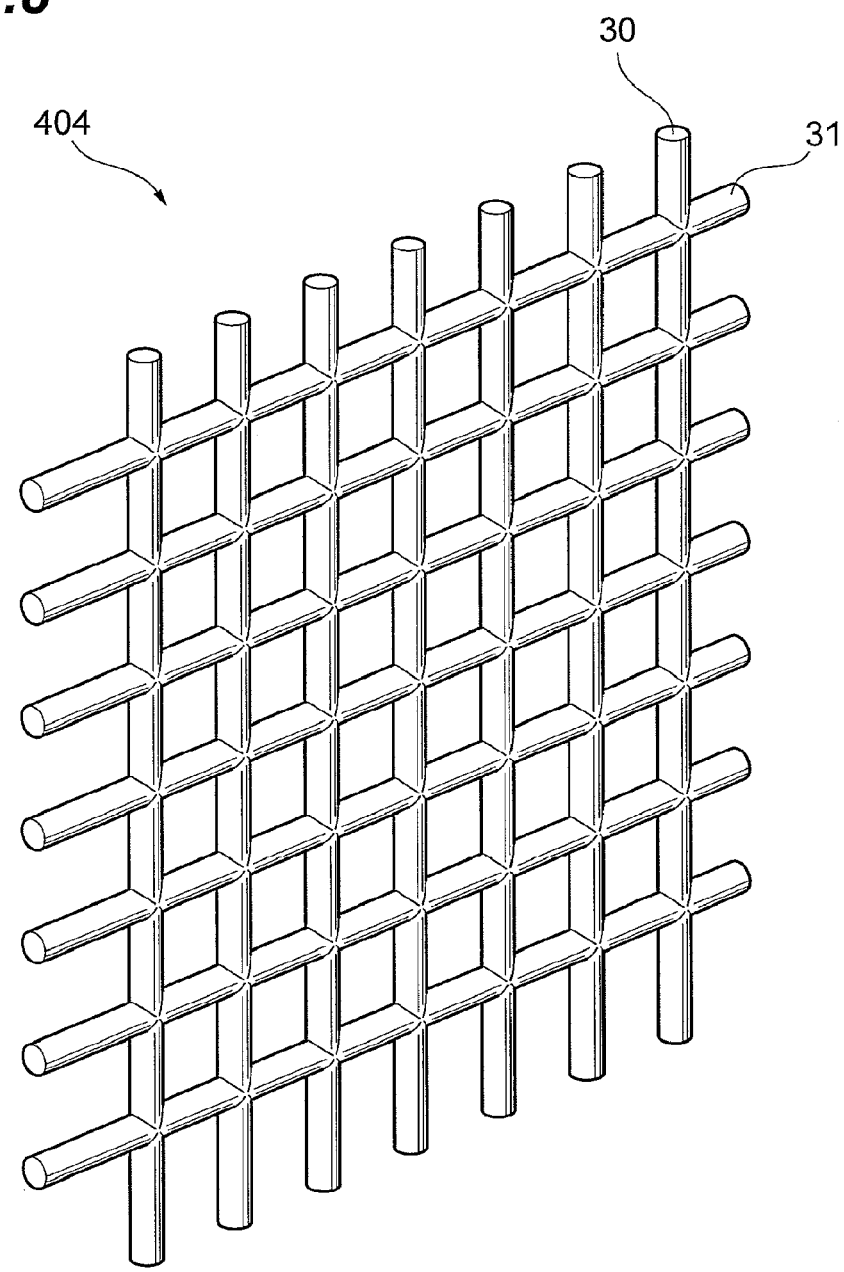
FIG. 8 is a diagram showing a wire guide according to an embodiment of the invention.
Figure 9:
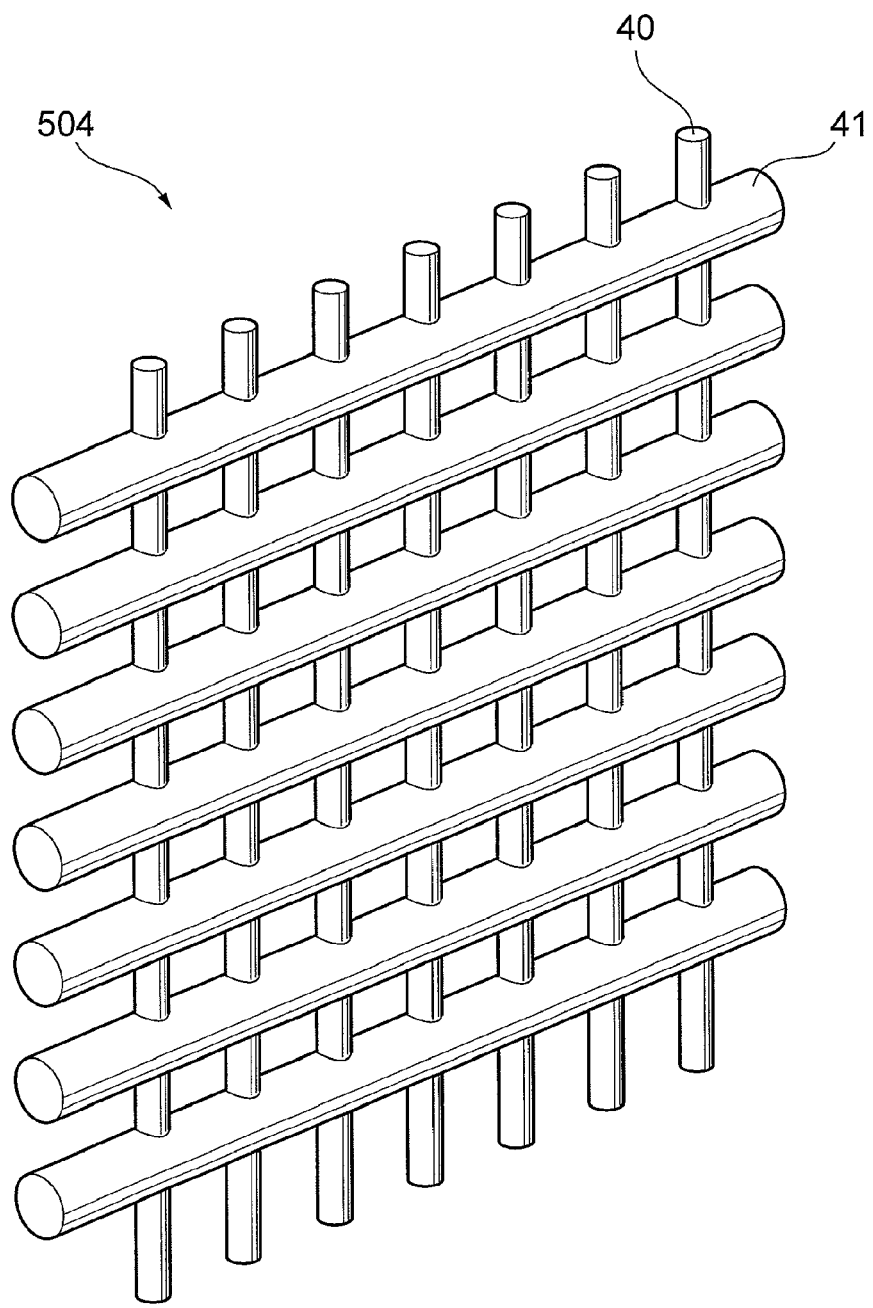
FIG. 9 is a diagram showing a wire guide according to an embodiment of the invention.

The wire guide 404 of FIG. 8 is a combination of vertical wires 30 and anchoring wires 31. The wire guide 504 in FIG. 9, likewise, is a combination of vertical wires 40 and anchoring wires 41, but the diameters of the anchoring wires 41 are larger than the diameters of the vertical wires 40, and therefore sections are produced that protrude out from the plane formed by the vertical wire group. According to this mode, the diameters of the anchoring wires will usually be in the range of 2-5-fold of the diameters of the vertical wires. The wire guide 604 of FIG. 10 has the vertical wires 50 and anchoring wires 51 woven into a form similar to a fish oven net. In this case, the sections where the wires cross have heights protruding from the plane formed by the vertical wire group, while the other sections are essentially in the same plane as the wires.

According to the production method of this embodiment, it is possible to produce a polycarbonate at a stable production rate Y (kg/(hr·100 mm)) represented by inequality (10), when $\Delta Mn$ is in the range of 500-10,000, representing the difference between the number-average molecular weight $Mn_0$ of the starting prepolymer loaded into the polymerization reactor and the number-average molecular weight $Mn_1$ of the polycarbonate produce in the polymerization reactor ($Mn_1 - Mn_0$).

$$Y \geq -0.00115 \times \Delta Mn + 0.1 \times t - 14 \quad (10)$$

Here, t represents the polymerization temperature, and Y (kg/(hr·100 mm)) represents the production weight in kg per hour for 100 mm in the horizontal direction of the wire guide.

According to a preferred mode of the production method of this embodiment, production can be accomplished at a stable production rate Y (kg/(hr·100 mm)) represented by inequality (11).

$$Y \geq -0.00155 \times \Delta Mn + 0.1 \times t - 10 \quad (11)$$

When an aromatic polycarbonate is to be produced according to this embodiment, a single polymerization reactor with a wire guide satisfying the conditions specified according to the invention may be used, or two or more such reactors may be used in combination. Also, the polymerization reactor of the invention may be combined with another polymerization reactor for production of an aromatic polycarbonate. For example, as one preferred mode of the invention, an agitating tank reactor may be used for the initial polymerization from an aromatic dihydroxy compound and a diaryl carbonate to produce a molten prep olymer, and the prepolymer polymerized using the polymerization reactor of the invention.

The apparatus used for production of the molten prepolymer may be the agitating tank reactor mentioned above, or for example, a thin-film reactor, a centrifugal thin-film evaporation reactor, a surface-renewal biaxial kneading reactor, a biaxial horizontal stirring reactor, or a wetted-wall reactor. According to the invention, these may also be used in combination for production of the desired prepolymer by stepwise polycondensation reaction. These production methods may be carried out with reference to U.S. Pat. No. 5,589,564, for example. There are no particular restrictions on the materials of such reactors, including the polymerization reactor of the invention, but at least the material composing the inner wall surface of the reactor is usually stainless steel, nickel, glass or the like.

The reaction temperature for production of an aromatic polycarbonate by reaction between an aromatic dihydroxy compound and a diaryl carbonate according to this embodiment will normally be 50-350° C., and it is preferably selected in the range of 100-290° C.

The aromatic monohydroxy compound is produced as the reaction proceeds, and the reaction rate increases by removing the product from the reaction system. Thus, it is preferred to use a method in which an inert gas that does not adversely affect the reaction, such as nitrogen, argon, helium, carbon dioxide or a lower hydrocarbon gas, is introduced and the aromatic monohydroxy compound that is produced is removed together with the gas, or a method in which the reaction is conducted under reduced pressure.

The preferred reaction temperature will differ depending on the type and molecular weight of the aromatic polycarbonate to be produced, and on the polymerization temperature, but for production of an aromatic polycarbonate from bisphenol A and a diphenyl carbonate, for example, it is preferably in the range of 100-270° C. for number-average molecular weights of up to 1000, or in the range of 200-290° C. for 1000 or greater.

The preferred reaction pressure will also differ depending on the type and molecular weight of the aromatic polycarbonate to be produced and on the polymerization temperature, but for production of an aromatic polycarbonate from bisphenol A and diphenyl carbonate, for example, it is preferably in the range of 50 mmHg (6660 Pa) to ordinary pressure for number-average molecular weights of up to 1000, 3 mmHg (400 Pa) to 50 mmHg (6660 Pa) for number-average molecular weights of 1000-2000, and no greater than 20 mmHg (2670 Pa), especially no greater than 10 mmHg (1330 Pa) and most preferably no greater than 2 mmHg (267 Pa) for number-average molecular weights exceeding 2000. Under reduced pressure, it is preferred to use a method in which the reaction is conducted while introducing the inert gas into the polymerization reactor. Also preferred is a method in which polymerization is carried out using a molten prepolymer that has already absorbed an inert gas.

The aromatic polycarbonate obtained by the method of the invention is usually pelletized, but a molding machine may be connected directly to produce a molded article such as a film, sheet or bottle. In order to micronize or remove the fisheyes, a polymer filter with a filtration fineness of about 1-50 μm may be installed. An extruder, mixer or the like may also be used for pelletizing with addition of additives such as stabilizers, antioxidants, dye or pigments, ultraviolet absorbers and flame retardants, or addition and melt kneading with additives including toughening agents such as glass fibers or fillers.

EXAMPLES

The invention will now be explained in greater detail by examples and comparative examples.

The evaluated properties were measured by the following methods.

(1) Number-average molecular weight: This was measured by gel permeation chromatography (HLC-8320GPC by Tosoh Corp., 2 TSK-GEL Super Multipore HZ-M columns, RI detector), with tetrahydrofuran as the eluent, and a temperature of 40° C. The molecular weight was determined from a calibration curve for standard monodisperse polystyrene (EasiVial, product of Varian) using an equivalent molecular weight calibration curve based on the following formula.

$$M_{PC}=0.3591\ M_{PS}^{1.0388}$$

(In the formula, $M_{PC}$ is the molecular weight of the polycarbonate and $M_{PS}$ is the molecular weight of polystyrene.)

(2) Fisheyes: A film with a thickness of 50 μm and a width of 30 cm was molded using a film-forming machine by Tanabe Plastics Machinery Co., Ltd. (30 mmφ single-screw extruder, screw rotational speed: 100 rpm, throughput: 10 kg/hr, barrel temperature: 280° C., T-die temperature: 260° C., roll temperature: 120° C.), and the number of fisheyes with sizes of at least 300 μm within an arbitrarily selected 1 m length was visually counted.

(3) Viscosity: The viscosity of the starting prepolymer and the obtained polycarbonate was measured at the temperature for each example and comparative example, using a sample of each material. The measuring apparatus used was a Capirograph by Toyo Seiki Co., Ltd. (CAPIROGRAPH 1B), Model A-271902103.

Example 1

The guide-contact fluidized polymerization reactor shown in FIG. 1(a) was used to produce an aromatic polycarbonate. The guide-contacted dropping polymerization reaction zone was in a circular cylindrical shape with an inner diameter of 300 mm and a length of 8000 mm, and was equipped with one wire guide as shown in FIG. 6, having anchoring wires provided on one side of a vertical wire group. The diameter of the vertical wires was 3 mm, the number of wires was 21, and the length edge to edge in the horizontal direction on the wire guide side was 203 mm. Holes were provided directly above the vertical wires, at L4=30 mm. Their locations were at every 3 vertical wires, at the top end, starting from the second vertical wire from the end, for a total of 7. The arrangement pitch L5 of the anchoring wires was 80 mm. The size details are shown in Table 1. The polymerization reactor material was entirely SUS316, and the outside of the polymerization reactor served as the jacket, with heating to 261° C. in a heating medium.

A molten prepolymer (aromatic polycarbonate number-average molecular weight (Mn): 4500), produced from bisphenol A and diphenyl carbonate (bisphenol A-based molar ratio: 1.08) and kept at 261° C. was continuously fed to the starting material feed zone 3 with a feed pump through the starting material feed port 1. The molten prepolymer, continuously fed to the guide-contacted dropping polymerization reaction zone 5 from the plurality of polymer feed holes 12 formed in the distributing plate 2 in the polymerization reactor, underwent polymerization reaction while dropping down along the wire guide 4. The molten prepolymer discharged through the holes dropped down along the wire guide set below the holes and contacted with itself in the horizontal direction 200 mm below the top edge of the wire guide, so that the dropping molten prepolymer mass appeared as a "sheet" with 100% of the sections satisfying inequality (1).

The pressure reduction in the guide-contacted dropping polymerization reaction zone 5 was adjusted through a vacuum vent port 6 so that the number-average molecular weight of the aromatic polycarbonate removed through the polymer discharge port 7 was 10,300. The produced aromatic polycarbonate, which dropped from the lower section of the wire guide 4 to the tapered lower section of the polymerization reactor casing, was continuously removed from the polymer discharge port 7 by a discharge pump 8, to maintain an essentially constant volume at the bottom part.

The number-average molecular weight of the obtained aromatic polycarbonate was measured each hour. A number-average molecular weight of 10,300±100 was confirmed continuously for 10 hours, and the molten prepolymer feed volume and the aromatic polycarbonate removal volume were increased in a stepwise manner. As a result, an aromatic polycarbonate removal volume (stable production rate) of up to 16 kg/(hr·100 mm) allowed stable production of an aromatic polycarbonate with a number-average molecular weight of 10,300±100 and a viscosity of 20,000 poise. The removal volume is the production volume per 100 mm in the horizontal direction on the wire guide surface composed of the vertical wire group, as a value represented by units of kg/(hr·100 mm). The obtained aromatic polycarbonate had no fisheyes. The results are shown in Table 1.

Example 2

An aromatic polycarbonate was produced in the same manner as Example 1, except that a wire guide with a vertical wire diameter of 1 mm and an L5 of 40 mm was used as the wire guide. It was confirmed that an aromatic polycarbonate with a number-average molecular weight of 10,300±100 can be stably produced for 10 hours. The stable production rate was 15 kg/(hr·100 mm), and no fisheyes were produced. The dropping molten prepolymer mass exhibited the appearance of a "sheet", and 100% of the sections satisfied inequality (1). The results are shown in Table 1.

Example 3

An aromatic polycarbonate was produced in the same manner as Example 1, except that a wire guide having 15 vertical wires with arrangement pitch L1 of 15 mm was used as the wire guide. It was confirmed that an aromatic polycarbonate with a number-average molecular weight of 10,300±100 and a viscosity of 20,000 poise can be stably produced for 10 hours. The stable production rate was 11 kg/(hr·100 mm), and no fisheyes were produced. The dropping molten prepolymer mass exhibited the appearance of a "sheet", and 100% of the sections satisfied inequality (1). The results are shown in Table 1.

Example 4

Figure 10:
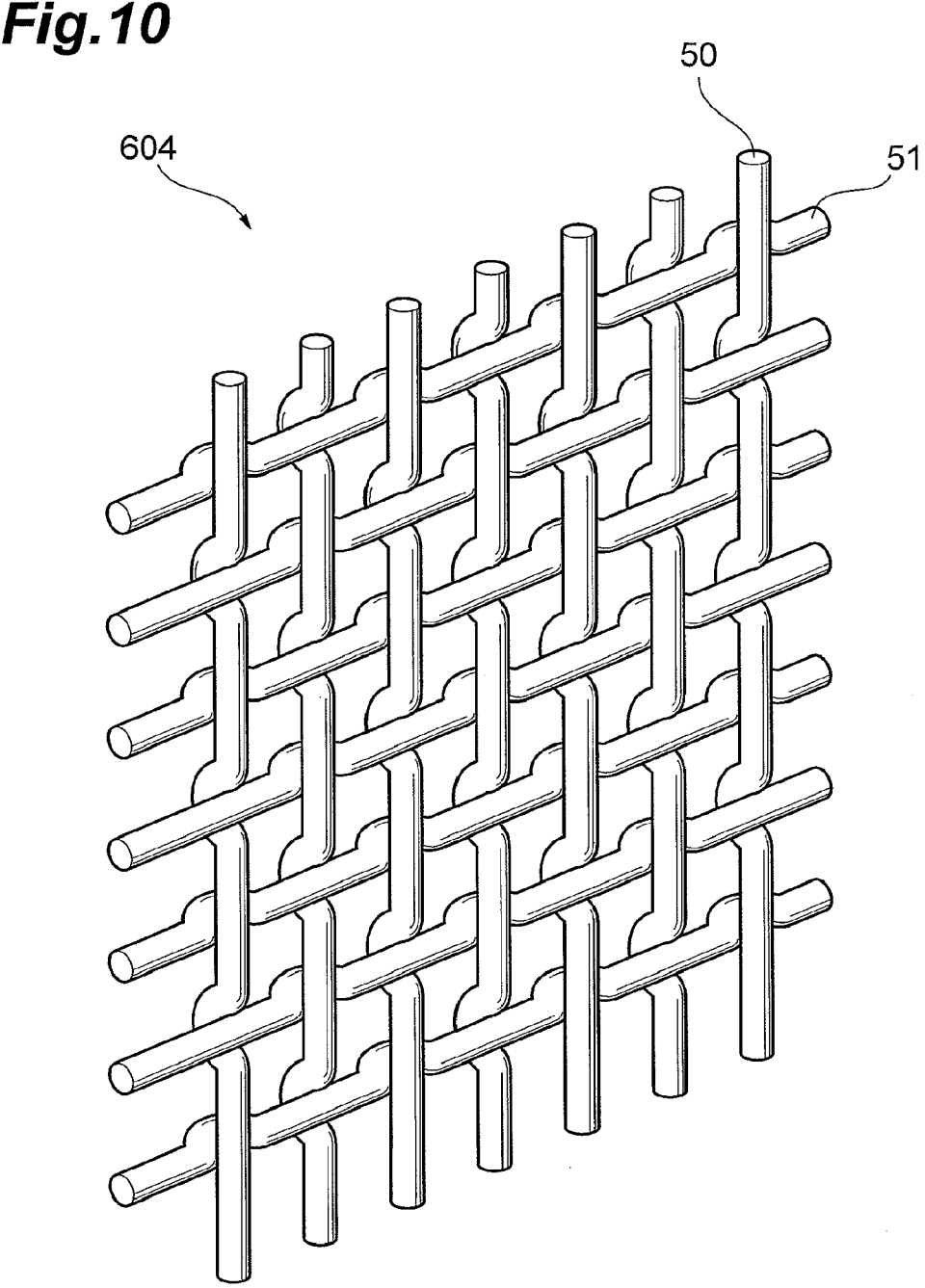
FIG. 10 is a diagram showing a wire guide according to an embodiment of the invention.

An aromatic polycarbonate was obtained in the same manner as Example 1, except that a wire guide such as shown in FIG. 10, having a vertical wire diameter of 3 mm and an L5 of 10 mm, was used as the wire guide. It was confirmed that an aromatic polycarbonate with a number-average molecular weight of 10,300±100 and a viscosity of 20,000 poise can be stably produced for 10 hours. The stable production rate was 9 kg/(hr·100 mm). The results are shown in Table 1. The molten prepolymer dropping down the wire guide surface in this example had 100% of its sections satisfying inequality (1), but the thickness was somewhat irregular and non-uniform. Also, at both ends of the wire guide surface, the molten prepolymer flowed less easily toward the bottom edge of the wire guide, and accumulated sections with almost no thickness (thin sections) were produced. The ratio (S2/S1) between the area S2 of the accumulated sections (thin sections) on the wire guide surface and the total area S1 was 0.08. The number of fisheyes in the polymer sampled 10 hours after production was 20. This was attributed to the polymer at the ends of the accumulated sections mixing with the polymer flowing from the upstream end, and being irregularly discharged.

Example 5

An aromatic polycarbonate was obtained in the same manner as Example 1, except that the number-average molecular weight of the supplied molten prepolymer was 2500, and the number-average molecular weight of the obtained aromatic polycarbonate was 5300. It was confirmed that an aromatic polycarbonate with a number-average molecular weight of 5300±50 and a viscosity of 400 poise can be stably produced for 10 hours. The stable production rate was 20 kg/(hr·100 mm), and no fisheyes were produced. The dropping molten prepolymer mass exhibited the appearance of a "sheet", and 100% of the sections satisfied inequality (1). The results are shown in Table 1.

Example 6

An aromatic polycarbonate was produced in the same manner as Example 5, except that a wire guide as shown in FIG. 7, having anchoring wires on both sides of the vertical wire group, was used as the wire guide. It was confirmed that an aromatic polycarbonate with a number-average molecular weight of 5300±50 can be stably produced for 10 hours. The stable production rate was 20 kg/(hr·100 mm), and 1 fisheye was produced. The dropping molten prepolymer mass exhibited the appearance of a "sheet", and 100% of the sections satisfied inequality (1). The results are shown in Table 1.

Comparative Example 1

A molten prepolymer was polymerized to produce an aromatic polycarbonate in the same manner as Example 1, except that a wire guide with 5 vertical wires and an L1 value of 55 mm was used. The holes through which the molten prepolymer was discharged were provided at the top edge of the vertical wire (i.e., L4=55 mm). The details for the conditions are shown in Table 1. The molten prepolymer discharged from each hole onto separate vertical wires dropped while foaming and expanding down to the bottom end of each individual vertical wire, without contacting the molten prepolymer dropping down in contact with the adjacent vertical wires. The L2 value was 20 mm. Since L1 was 55 mm, the number of vertical wires was less than ¼ compared to Example 1 in which L1 was 10 mm. It was confirmed that an aromatic polycarbonate with a number-average molecular weight of 10,300±100 and a viscosity of 20,000 poise can be stably produced for 10 hours. The stable production rate was 5 kg/(hr·100 mm), and no fisheyes were produced. The results are shown in Table 1.

Comparative Example 2

A molten prepolymer was polymerized to produce an aromatic polycarbonate in the same manner as Example 5, except that a wire guide with 8 vertical wires and an L1 value of 30 mm was used. The holes through which the molten prepolymer was discharged were provided at the top edge of the vertical wire (i.e., L4=30 mm). The details for the conditions are shown in Table 1. The molten prepolymer discharged from each hole onto separate vertical wires dropped while foaming and expanding down to the bottom end of each individual vertical wire, without contacting the molten prepolymer dropping down in contact with the adjacent vertical wires. The L2 value was 23 mm. The number of vertical wire guides per unit area of the polymerization reactor was smaller compared to Example 5. It was confirmed that an aromatic polycarbonate with a number-average molecular weight of 5300±50 and a viscosity of 400 poise can be stably produced for 10 hours. The stable production rate was 4 kg/(hr·100 mm), and no fisheyes were produced. The results are shown in Table 1.

Comparative Example 3

A molten prepolymer was polymerized to produce an aromatic polycarbonate in the same manner as Example 1, except that a wire guide with 4 vertical wires and an L1 value of 70 mm was used. The holes through which the molten prepolymer was discharged were provided at the top edge of the vertical wire (i.e., L4=70 mm). The details for the conditions are shown in Table 1. The molten prepolymer discharged from each hole onto separate vertical wires dropped while foaming and expanding down to the bottom end of each individual vertical wire, without contacting the molten prepolymer dropping down in contact with the adjacent vertical wires. The L2 value was 40 mm. It was confirmed that an aromatic polycarbonate with a number-average molecular weight of 10,300±100 and a viscosity of 20,000 poise can be stably produced for 10 hours. The stable production rate was 4 kg/(hr·100 mm), and no fisheyes were produced. The results are shown in Table 1.

Comparative Example 4

A molten prepolymer was polymerized to produce an aromatic polycarbonate in the same manner as Example 5, except that a wire guide with 10 vertical wires and an L1 value of 24 mm was used. The holes through which the molten prepolymer was discharged were provided at the top edge of the vertical wire (i.e., L4=24 mm). The details for the conditions are shown in Table 1. The molten prepolymer discharged from each hole onto separate vertical wires dropped while foaming and expanding down to the bottom end of each individual vertical wire, without contacting the molten prepolymer dropping down in contact with the adjacent vertical wires. The L2 value was 23 mm. It was confirmed that an aromatic polycarbonate with a number-average molecular weight of 5300±50 and a viscosity of 400 poise can be stably produced for 10 hours. The stable production rate was 5 kg/(hr·100 mm), and no fisheyes were produced. The results are shown in Table 1.

Example 7

The wire guide shown in FIG. 6, provided with anchoring wires on one side of the vertical wire group, was used as the wire guide. Using 3 such wire guides, each wire guide was linked by a support material at an arrangement pitch L3 of 65 mm. The other conditions were as in Example 1, to produce an aromatic polycarbonate. It was confirmed that an aromatic polycarbonate with a number-average molecular weight of 10,300 can be stably produced for 10 hours. The stable production rate was 16 kg/(hr·100 mm), and no fisheyes were produced. The production volume per polymerization reactor was 3-fold of that of Example 1. The results are shown in Table 1. The molten prepolymer mass dropped down on each wire guide as a "sheet", and 100% of the sections satisfied inequality (1). Gaps were present in the molten prepolymer between different wire guides, with no contact between them.

Example 8

The wire guide shown in FIG. 6, provided with anchoring wires on one side of the vertical wire group, was used as the wire guide. The number of vertical wires was 18, and the arrangement pitch L1 was 12 mm. Using 3 such wire guides, each wire guide was linked by a support material at an arrangement pitch L3 of 80 mm. The other conditions were as in Example 7, to produce an aromatic polycarbonate. It was confirmed that an aromatic polycarbonate with a number-average molecular weight of 10,300 can be stably produced for 10 hours. The stable production rate was 13 kg/(hr·100 mm), and no fisheyes were produced. The production volume per polymerization reactor was 3-fold of that of Example 1. The results are shown in Table 1. The molten prepolymer mass dropped down on each wire guide as a "sheet", and 100% of the sections satisfied inequality (1). Gaps were present in the molten prepolymer between different wire guides, with no contact between them.

Example 9

An aromatic polycarbonate was produced in the same manner as Example 7, except that the polymerization temperature was 270° C., the feed rate of the molten prepolymer was increased, and the L3 value was 80 mm. It was confirmed that an aromatic polycarbonate with a number-average molecular weight of 10,300±50 can be stably produced for 10 hours. The stable production rate was 35 kg/(hr·100 mm), and no fisheyes were produced. The dropping molten prepolymer mass exhibited the appearance of a "sheet". The results are shown in Table 1.

Example 10

An aromatic polycarbonate was produced in the same manner as Example 7, except that the polymerization temperature was 280° C., the feed rate of the molten prepolymer was increased, and the L3 value was 80 mm. It was confirmed that an aromatic polycarbonate with a number-average molecular weight of 10,300±50 can be stably produced for 10 hours. The stable production rate was 65 kg/(hr·100 mm), and no fisheyes were produced. The dropping molten prepolymer mass exhibited the appearance of a "sheet", and 100% of the sections satisfied inequality (1). The results are shown in Table 1.

Example 11

An aromatic polycarbonate was produced in the same manner as Example 1, except that the number-average molecular weight of the supplied molten prepolymer was 6000. It was confirmed that an aromatic polycarbonate with a number-average molecular weight of 10,300±1100 and a viscosity of 20,000 poise can be stably produced for 10 hours. The stable production rate was 20 kg/(hr·100 mm), and no fisheyes were produced. The dropping molten prepolymer mass exhibited the appearance of a "sheet", and 100% of the sections satisfied inequality (1). The results are shown in Table 2.

Example 12

An aromatic polycarbonate was obtained in the same manner as Example 1, except that the number-average molecular weight of the supplied molten prepolymer was 6200, the number-average molecular weight of the obtained aromatic polycarbonate was 14,500, and the polymerization temperature was 265° C. It was confirmed that an aromatic polycarbonate with a number-average molecular weight of 14,500±100 can be stably produced for 10 hours. The stable production rate was 8 kg/(hr·100 mm), and no fisheyes were produced. The dropping molten prepolymer mass exhibited the appearance of a "sheet", and 100% of the sections satisfied inequality (1). The results are shown in Table 2.

Example 13

An aromatic polycarbonate was obtained in the same manner as Example 1, except that the polyfunctional compound 1,1,1-tris(4-hydroxyphenyl)ethane was added to the starting molten prepolymer as a branching agent at 0.4 mol % with respect to the bisphenol A used as a starting material of the molten prepolymer, the number-average molecular weight of the obtained aromatic polycarbonate was 10,500, and the polymerization temperature was 265° C. It was confirmed that an aromatic polycarbonate with a number-average molecular weight of 10,500±100 can be stably produced for 10 hours. The stable production rate was 25 kg/(hr·100 mm), and 1 fisheye was produced. The dropping molten prepolymer mass exhibited the appearance of a "sheet", and 100% of the sections satisfied inequality (1). The results are shown in Table 2.

Example 14

An aromatic polycarbonate was obtained in the same manner as Example 1, except that the polyfunctional compound 1,1,1-tris(4-hydroxyphenyl)ethane was added to the starting molten prepolymer as a branching agent at 0.3 mol % with respect to the bisphenol A used as a starting material of the molten prepolymer, the number-average molecular weight of the supplied molten prepolymer was 6000, the number-average molecular weight of the obtained aromatic polycarbonate was 10,500, and the polymerization temperature was 265° C. It was confirmed that an aromatic polycarbonate with a number-average molecular weight of 10,500±100 can be stably produced for 10 hours. The stable production rate was 30 kg/(hr·100 mm), and 1 fisheye was produced. The dropping molten prepolymer mass exhibited the appearance of a "sheet", and 100% of the sections satisfied inequality (1). The results are shown in Table 2.

Comparative Example 5

An aromatic polycarbonate was produced in the same manner as Comparative Example 1, except that the number-average molecular weight of the supplied molten prepolymer was 6000. It was confirmed that an aromatic polycarbonate with a number-average molecular weight of 10,300±100 can be stably produced for 10 hours. The stable production rate was 6 kg/(hr·100 mm), and 0 fisheyes were produced. The molten prepolymer discharged from each hole onto separate vertical wires dropped while foaming and expanding down to the bottom end of each individual vertical wire, without contacting the molten prepolymer dropping down in contact with the adjacent vertical wires. The L2 value was 28 mm. The results are shown in Table 2.

Example 15

An aromatic polycarbonate was obtained in the same manner as Example 1, except that a wire guide such as shown in FIG. 8, having a vertical wire diameter of 3 mm and an L5 of 10 mm, was used as the wire guide. It was confirmed that an aromatic polycarbonate with a number-average molecular weight of 10,300±100 and a viscosity of 20,000 poise can be stably produced for 10 hours. The stable production rate was 14 kg/(hr·100 mm), and 3 fisheyes were produced. The dropping molten prepolymer mass exhibited the appearance of a "sheet", and 100% of the sections satisfied inequality (1). The results are shown in Table 2.

TABLE 1

|  |  | Example 1 | Example 2 | Example 3 | Example 4 | Example 5 | Example 6 | Comp. Ex. 1 |
|---|---|---|---|---|---|---|---|---|
| Starting prepolymer | Number-average molecular wt. (Mn) | 4500 | 4500 | 4500 | 4500 | 2500 | 2500 | 4500 |
|  | Viscosity η (poise) | 200 | 200 | 200 | 200 | 25 | 25 | 200 |
| Wire guide structure | Length (mm) | 8000 | 8000 | 8000 | 8000 | 8000 | 8000 | 8000 |
|  | Width (mm) | 203 | 201 | 213 | 203 | 203 | 203 | 223 |
|  | L1 (mm) | 10 | 10 | 15 | 10 | 10 | 10 | 55 |
|  | L5 (mm) | 80 | 40 | 80 | 10 | 80 | 80 | 80 |
|  | L2 (mm) | 213 | 211 | 223 | 213 | 213 | 213 | 20 |
|  | L3 (mm) | — | — | — | — | — | — | — |
|  | L4 (mm) | 30 | 30 | 30 | 30 | 30 | 30 | 55 |
|  | L2/T1 | 10 | 11 | 11 | 10 | 18 | 16 | 1 |
|  | S2/S1 | 0 | 0 | 0 | 0.08 | 0 | 0 | — |
|  | Guide structure | FIG. 6 | FIG. 6 | FIG. 6 | FIG. 10 | FIG. 6 | FIG. 7 | FIG. 6 |
|  | Number of vertical wires | 21 | 21 | 15 | 21 | 21 | 21 | 5 |
| Polymerization conditions | Temperature (° C.) | 261 | 261 | 261 | 261 | 261 | 261 | 261 |
|  | Pressure (Pa) | 50 | 50 | 50 | 50 | 800 | 800 | 50 |
| Obtained polycarbonate | Number-average molecular wt. (Mn) | 10300 | 10300 | 10300 | 10300 | 5300 | 5300 | 10300 |
|  | Viscosity η (poise) | 20000 | 20000 | 20000 | 20000 | 400 | 400 | 20000 |
|  | No. of fisheyes | 0 | 0 | 0 | 20 | 0 | 1 | 0 |
|  | Stable production rate (kg/(hr · 100 mm)) | 16 | 15 | 11 | 9 | 20 | 20 | 5 |

|  |  | Comp. Ex. 2 | Comp. Ex. 3 | Comp. Ex. 4 | Example 7 | Example 8 | Example 9 | Example 10 |
|---|---|---|---|---|---|---|---|---|
| Starting prepolymer | Number-average molecular wt. (Mn) | 2500 | 4500 | 2500 | 4500 | 4500 | 4500 | 4500 |
|  | Viscosity η (poise) | 25 | 200 | 25 | 200 | 200 | 200 | 200 |
| Wire guide structure | Length (mm) | 8000 | 8000 | 8000 | 8000 | 8000 | 8000 | 8000 |
|  | Width (mm) | 213 | 213 | 219 | 203 | 207 | 203 | 203 |
|  | L1 (mm) | 30 | 70 | 24 | 10 | 12 | 10 | 10 |
|  | L5 (mm) | 80 | 80 | 80 | 80 | 80 | 80 | 80 |
|  | L2 (mm) | 23 | 20 | 23 | 213 | 214 | 213 | 213 |
|  | L3 (mm) | — | — | — | 65 | 80 | 80 | 80 |
|  | L4 (mm) | 30 | 70 | 24 | 30 | 36 | 30 | 30 |
|  | L2/T1 | 1 | 1 | 1 | 10 | 11 | 9 | 8 |
|  | S2/S1 | — | — | — | 0 | 0 | 0 | 0 |
|  | Guide structure | FIG. 6 | FIG. 6 | FIG. 6 | FIG. 6 | FIG. 6 | FIG. 6 | FIG. 6 |
|  | Number of vertical wires | 8 | 4 | 10 | 21 | 18 | 21 | 21 |
| Polymerization conditions | Temperature (° C.) | 261 | 261 | 261 | 261 | 261 | 270 | 280 |
|  | Pressure (Pa) | 800 | 50 | 800 | 50 | 50 | 50 | 50 |
| Obtained polycarbonate | Number-average molecular wt. (Mn) | 5300 | 10300 | 5300 | 10300 | 10300 | 10300 | 10300 |
|  | Viscosity η (poise) | 400 | 20000 | 400 | 20000 | 20000 | 13000 | 7000 |
|  | No. of fisheyes | 0 | 0 | 0 | 0 | 0 | 0 | 0 |
|  | Stable production rate (kg/(hr · 100 mm)) | 4 | 4 | 5 | 16 | 13 | 35 | 65 |

TABLE 2

|  |  | Example 11 | Example 12 | Example 13 | Example 14 | Comp. Ex. 5 | Example 15 |
|---|---|---|---|---|---|---|---|
| Starting prepolymer | Number-average molecular wt. (Mn) | 6000 | 6200 | 4500 | 6000 | 6000 | 4500 |
|  | Viscosity η (poise) | 700 | 1000 | 200 | 700 | 700 | 200 |
| Wire guide structure | Length (mm) | 8000 | 8000 | 8000 | 8000 | 8000 | 8000 |
|  | Width (mm) | 203 | 203 | 203 | 203 | 223 | 203 |
|  | L1 (mm) | 10 | 10 | 10 | 10 | 55 | 10 |
|  | L5 (mm) | 80 | 80 | 80 | 80 | 80 | 10 |
|  | L2 (mm) | 213 | 214 | 213 | 213 | 28 | 213 |
|  | L3 (mm) | — | — | — | — | — | — |
|  | L4 (mm) | 30 | 30 | 30 | 30 | 55 | 30 |
|  | L2/T1 | 11 | 12 | 10 | 11 | 1 | 10 |
|  | S2/S1 | 0 | 0 | 0 | 0 | — | 0.04 |
|  | Guide structure | FIG. 6 | FIG. 6 | FIG. 6 | FIG. 6 | FIG. 6 | FIG. 8 |
|  | Number of vertical wires | 21 | 21 | 21 | 21 | 5 | 21 |

TABLE 2-continued

|  |  | Example 11 | Example 12 | Example 13 | Example 14 | Comp. Ex. 5 | Example 15 |
| --- | --- | --- | --- | --- | --- | --- | --- |
| Polymerization conditions | Temperature (° C.) | 261 | 265 | 265 | 265 | 261 | 261 |
|  | Pressure (Pa) | 50 | 50 | 50 | 50 | 50 | 50 |
| Obtained polycarbonate | Number-average molecular wt. (Mn) | 10300 | 14500 | 10500 | 10500 | 10300 | 10300 |
|  | Viscosity η (poise) | 20000 | 70000 | 62000 | 62000 | 20000 | 20000 |
|  | No. of fisheyes | 0 | 0 | 1 | 1 | 0 | 3 |
|  | Stable production rate (kg/(hr · 100 mm)) | 20 | 8 | 25 | 30 | 6 | 14 |

INDUSTRIAL APPLICABILITY

As demonstrated by the examples described above, the invention provides a wire guide for production of a condensation polymerization reaction polymer, by polymerization of a molten prepolymer as the precursor for a condensation polymerization reaction polymer (particularly an aromatic polycarbonate obtained by reaction of an aromatic dihydroxy compound with a diaryl carbonate) to efficiently produce, at a high polymerization rate, a high-quality polycarbonate having reduced fisheyes as in the prior art, while also having excellent molecular weight stability. It also provides a method for producing a condensation polymerization reaction polymer, and a polymerization reactor, wherein the wire guide is employed.

REFERENCE SIGNS LIST

1: Starting material feed port, 2: distributing plate, 3: starting material feed zone, 4, 304, 404, 504, 604: wire guides, 5: guide-contacted dropping polymerization reaction zone, 6: vacuum vent port, 7: polymer discharge port, 8: discharge pump, 9: optional inert gas supply port, 10, 30, 40, 50: wires in vertical direction (vertical wires), 11, 31, 41, 51: wires in horizontal direction (anchoring wires), 12: polymer feed hole, 15: molten prepolymer mass, 20: molten prepolymer, 100: guide-contacted dropping polymerization reactor (polymerization reactor).

The invention claimed is:

1. A method for producing a condensation polymerization reaction polymer, comprising a guide polymerization step in which a molten prepolymer is supplied to the top edge of a wire guide in a polymerization reactor for production of a condensation polymerization reaction polymer, and is allowed to drop while contacting the wire guide in conducting polymerization of the molten prepolymer and to obtain the condensation polymerization reaction polymer, the wire guide comprising a vertical wire group comprising a plurality of vertical wires extending in the vertical direction, which are mutually spaced in alignment at an arrangement pitch L1 (mm), wherein:
in the guide polymerization step,
the molten prepolymer supplied from the top edge of the wire guide aggregates so that a molten prepolymer mass is formed on the vertical wire, and
a molten prepolymer mass is formed wherein, the width of the molten prepolymer mass measured in an alignment direction of the vertical wires at a position 200 mm below the top edge being represented as L2 (mm), the width L2 (mm) of at least a portion of the molten prepolymer mass satisfies the relationship with L1 (mm) as defined by inequality (1), $$L1 < L2 \tag{1}.$$

2. The method according to claim 1, wherein L2 is at least 3-fold of L1.

3. The method according to claim 1, wherein the wire guide comprises a plurality of anchoring wires that link the plurality of vertical wires of the vertical wire group and anchor the positional relationship between the vertical wires, and an arrangement pitch L5 (mm) of the anchoring wires is at least 1.5-fold of L1, and L1 is 3-20 mm.

4. The method according to claim 1, characterized by satisfying the relationship between S1 and S2 as defined by the following inequality (7), $$(S2/S1) < 0.05 \tag{7}$$

wherein the total area of the wire guide as seen from a horizontal direction perpendicular to an alignment direction of the vertical wires is represented by S1 (mm$^2$);
the average thickness of the molten prepolymer mass formed on the wire guide is represented as T2 (mm); and
the area of thin sections as seen from a horizontal direction perpendicular to an alignment direction of the vertical wires are represented by S2 (mm$^2$) when a section of the molten prepolymer mass having a thickness of no greater than ⅓ of T2 are the thin sections.

5. The method according to claim 1, wherein the relationship between a viscosity η (poise) of the molten prepolymer supplied to the top edge of the wire guide and L1 (mm) satisfies inequality (4), $$1 < L1 < 0.11 \times \eta \pm 15 \tag{4}.$$

6. The method according to claim 1, wherein the condensation polymerization reaction polymer is an aromatic polycarbonate.

7. The method for producing a condensation polymerization reaction polymer according to claim 1, wherein a wire guide for production of a condensation polymerization reaction polymer is employed to obtain the condensation polymerization reaction polymer by conducting polymerization of the polymerization material composed of a molten prepolymer allowed to drop down while in contact, in a polymerization reactor for production of a condensation polymerization reaction polymer, the wire guide comprising a vertical wire group comprising a plurality of vertical wires that extend in the vertical direction and are mutually spaced in alignment, and an anchoring wire that links the plurality of vertical wires of the vertical wire group and anchors a positional relationship between the vertical wires,
wherein, assuming a tabular virtual space containing the vertical wire group while extending in an alignment direction of the vertical wires, and delineation by a pair of virtual vertical planes sandwiching the vertical wire group, the anchoring wire extends along a virtual vertical plane outside of the virtual space while being anchored to the plurality of vertical wires of the vertical wire group on the virtual vertical plane, and lies only on the side of one of the virtual vertical planes of the virtual space.

8. A method for producing a condensation polymerization reaction polymer wherein a polymerization material composed of a molten prepolymer is allowed to drop down in a polymerization reactor while in contact with a wire guide extending in the vertical direction, for polymerization of the polymerization material, to obtain a condensation polymerization reaction polymer, wherein the wire guide is disposed in the polymerization reactor, the wire guide comprising a vertical wire group comprising a plurality of vertical wires that extend in the vertical direction and mutually spaced in alignment, and an anchoring wire that links the plurality of vertical wires of the vertical wire group and anchors the positional relationship between the vertical wires, wherein assuming a tabular virtual space containing the vertical wire group while extending in an alignment direction of the vertical wires, and delineation by a pair of virtual vertical planes sandwiching the vertical wire group, and the anchoring wire extends along a virtual vertical plane outside of the virtual space while being anchored to the plurality of vertical wires of the vertical wire group on the virtual vertical plane.

9. The method for producing a condensation polymerization reaction polymer according to claim 8, wherein the polymerization reactor comprises a starting material feed port, a starting material feed zone communicating with the starting material feed port, a guide-contacted dropping polymerization reaction zone located at a lower section of the starting material feed zone and communicating with the starting material feed zone, and a polymer discharge port located at a lower section of the guide-contacted dropping polymerization reaction zone, wherein the guide-contacted dropping polymerization reaction zone is provided with the wire guide that allows the polymerization material supplied from the starting material feed zone to drop down while in contact therewith for polymerization of the polymerization material, wherein the polymerization reactor comprises a plurality of the wire guides, each of the wire guides is arranged in an arrangement pitch of L3 (mm) in a direction perpendicular to an alignment direction of the vertical wires, and the relationship between an arrangement pitch L1 (mm) of the vertical wires and L3 satisfies inequality (2):

$$2 \times L1 < L3 \qquad (2).$$

10. The method for producing a condensation polymerization reaction polymer according to claim 8, wherein the polymerization reactor comprising a starting material feed port, a starting material feed zone communicating with the starting material feed port, a guide-contacted dropping polymerization reaction zone located at a lower section of the starting material feed zone and communicating with the starting material feed zone, and a polymer discharge port located at a lower section of the guide-contacted dropping polymerization reaction zone, wherein the guide-contacted dropping polymerization reaction zone is provided with the wire guide that allows the polymerization material supplied from the starting material feed zone to drop down while in contact therewith for polymerization of the polymerization material, wherein the polymerization reactor further comprises a plurality of polymer feed holes that are provided at the top edge of the polymerization reaction zone in which the wire guide is housed and that feed the molten prepolymer to the top edge of the wire guide, the polymer feed holes are arranged at an arrangement pitch of L4 (mm) in an alignment direction of the vertical wires, vertically above the wire guide, and the relationship between L4 and an arrangement pitch L1 (mm) of the vertical wires satisfies inequality (3):

$$L4 > L1 \qquad (3).$$

* * * * *